United States Patent [19]

Chang

[11] Patent Number: 5,734,763
[45] Date of Patent: Mar. 31, 1998

[54] COMPACT TWO-BY-N OPTICAL COMPONENTS BASED ON BIERFRINGENT WALK-OFF CRYSTALS

[75] Inventor: Kok Wai Chang, Sunnyvale, Calif.

[73] Assignee: Hewlett-Packard Company, Palo Alto, Calif.

[21] Appl. No.: 707,559

[22] Filed: Sep. 4, 1996

[51] Int. Cl.[6] .................. G02B 5/30; G02B 6/00
[52] U.S. Cl. .................. 385/11; 359/485; 359/497
[58] Field of Search .................. 349/196; 385/11, 385/33; 359/485, 497

[56] References Cited

U.S. PATENT DOCUMENTS

| | | | |
|---|---|---|---|
| 4,178,073 | 12/1979 | Uchida et al. | 350/151 |
| 4,974,944 | 12/1990 | Chang | 350/335 |
| 5,047,668 | 9/1991 | Bosenberg | 372/20 |
| 5,151,955 | 9/1992 | Ohta | 385/6 |
| 5,237,445 | 8/1993 | Kuzuta | 359/281 |
| 5,262,892 | 11/1993 | Shinkosha | 359/497 |
| 5,315,431 | 5/1994 | Masuda et al. | 359/281 |
| 5,381,261 | 1/1995 | Hirai et al. | 359/282 |
| 5,428,477 | 6/1995 | Siroki | 359/484 |
| 5,446,578 | 8/1995 | Chang et al. | 359/282 |
| 5,471,340 | 11/1995 | Cheng et al. | 385/11 |
| 5,539,574 | 7/1996 | Robinson | 359/484 |
| 5,557,692 | 9/1996 | Pan et al. | 385/11 |
| 5,588,078 | 12/1996 | Cheng et al. | 385/33 |
| 5,611,004 | 3/1997 | Chang et al. | 385/11 |

FOREIGN PATENT DOCUMENTS

WO 97/22034  6/1997  WIPO.

OTHER PUBLICATIONS

Shinkosha, Isolator Revolution, ISO–SPI Data Sheet no date.

Primary Examiner—William L. Sikes
Assistant Examiner—Tsep H. Nguyen
Attorney, Agent, or Firm—Ian Hardcastle

[57] ABSTRACT

The optical component comprises a first I/O port, a second I/O port and a polarization-changing optical element located between the first I/O port and the second I/O port. The second I/O port is optically aligned with the first I/O port. The first I/O port includes a first opposed walk-off crystal pair and a second opposed walk-off crystal pair. The second opposed walk-off crystal pair is a mirror image of the first opposed walk-off crystal pair. Each opposed walk-off crystal pair comprises two walk-off crystals. Each walk-off crystal has a walk-off direction. Each walk-off crystal includes an attachment face substantially parallel to the walk-off direction, a first face orthogonal to the attachment faces, and a second face opposite the first face. The walk-off crystals are attached to one another with their attachment faces in contact, and their walk-off directions opposed. The opposed walk-off directions of the walk-off crystals of the first opposed walk-off crystal pair and the opposed walk-off directions of the walk-off crystals of the second opposed walk-off crystal pair define opposite rotational directions. The opposed walk-off crystal pairs are attached to one another with the second face of one in contact of the first face of the other, and with the walk-off direction of the one orthogonal to the walk-off direction of the other.

30 Claims, 14 Drawing Sheets

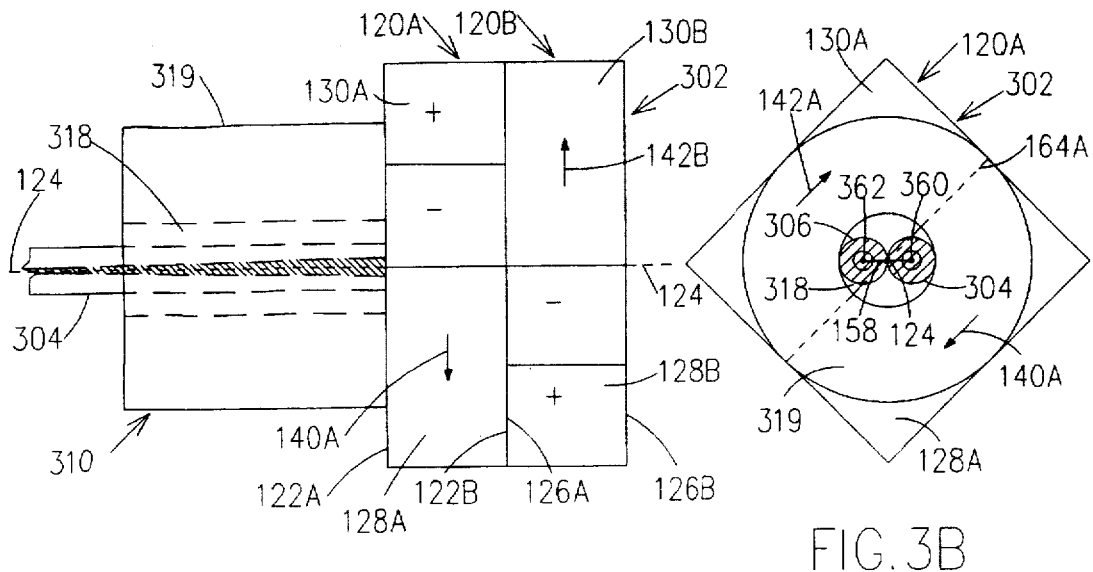
FIG.3C
FIG.3B
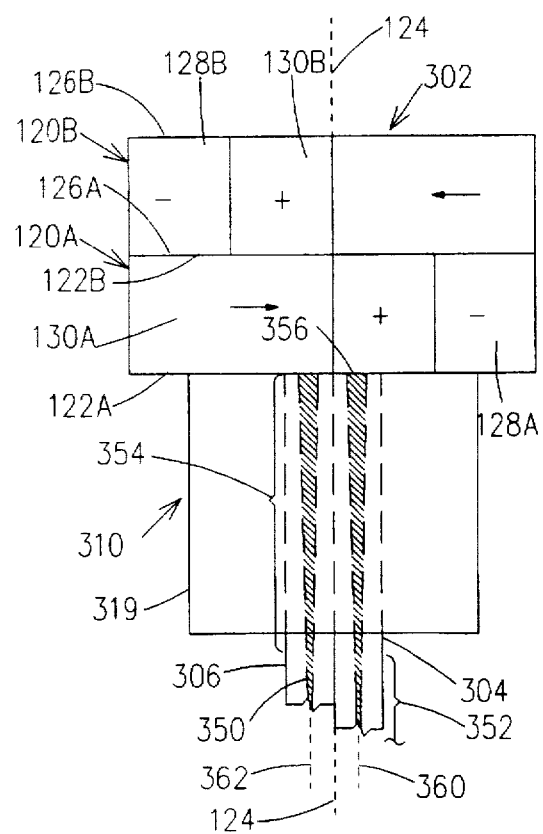
FIG.3D

COMPACT TWO-BY-N OPTICAL COMPONENTS BASED ON BIERFRINGENT WALK-OFF CRYSTALS

FIELD OF THE INVENTION

The present invention relates to a compact building block for use in a number of different compact, miniature optical components, in particular to a building block based on birefringent walk-off crystals that can be used as the basis of a such optical components as three- and four-port optical circulators, optical switches, and tuneable add, drop and add-drop filters. The invention also relates to three- and four-port optical circulators, optical switches and tuneable add, drop, and add-drop filters based on this building block.

BACKGROUND OF THE INVENTION

The flexibility of communication networks based on light signals conducted via optical fibres is greatly increased by the availability of optical fibre-compatible optical components such as circulators, switches and tuneable filters. Optical circulators enable light signals to be routed from one optical fibre to another. Optical switches enable light signals to be selectively transmitted via one or more optical fibres. Optical add, drop, and add-drop filters enable light signals at different optical frequencies to be selectively transmitted and received via an optical fibre.

Conventional optical components of the types discussed above are made of discrete optical elements. As a result, such optical components are bulky and expensive. A substantial portion of the cost of making such optical components arises because the elements of such components are physically large and have to be individually and precisely aligned relative to one another. For example, a recent catalog published by the Fuji Electrochemical Corporation, Tokyo, Japan shows a Model YC-115A four-port optical circulator with dimensions of 43×30×8 mm, excluding the optical fibre connectors. A Model YS-111A 2×2 optical switch has dimensions of 50×43×8 mm, excluding the optical fibre connectors. The large size of these components limits the density with which optical fibre switching systems can be built.

To further increase the flexibility of communication networks based on light signals conducted via optical fibres, it is necessary to increase the density with which optical fibre switching systems can be built, and to reduce substantially the cost of the optical components used in such switching systems.

SUMMARY OF THE INVENTION

The invention provides a compact, 2×n (n=1 or 2), polarization-independent optical component that comprises a first I/O port, a second I/O port and a polarization-changing optical element located between the first I/O port and the second I/O port. The second I/O port is optically aligned with the first I/O port. The first I/O port includes a first opposed walk-off crystal pair and a second opposed walk-off crystal pair, a mirror image of the first opposed walk-off crystal pair. Each opposed walk-off crystal pair comprises two walk-off crystals. Each walk-off crystal has a walk-off direction. Each walk-off crystal includes an attachment face substantially parallel to the walk-off direction, a first face orthogonal to the attachment faces, and a second face opposite the first face. The walk-off crystals are attached to one another with their attachment faces in contact, and their walk-off directions opposed. The opposed walk-off directions of the walk-off crystals of the first opposed walk-off crystal pair and the opposed walk-off directions of the walk-off crystals of the second opposed walk-off crystal pair define opposite rotational directions. The opposed walk-off crystal pairs are attached to one another with the second face of one in contact of the first face of the other, and with the walk-off direction of the one orthogonal to the walk-off direction of the other.

Each opposed walk-off crystal pair may additionally include a first axis extending orthogonally to the first faces of the opposed walk-off crystal pairs from an intersection of the attachment faces of the opposed walk-off crystal pairs. The first I/O port may additionally include a capillary and two optical fibres, each having an optical axis. The capillary defines a bore and is attached to the first face of the one of the opposed walk-off crystal pairs with the bore centered on, and longitudinally aligned with, the first axis. The optical fibres are housed in parallel, inside, and in contact with, the bore of the capillary, with a second axis, extending between the optical axes of the optical fibres, being aligned at substantially 45° to the walk-off directions of the opposed walk-off crystal pairs.

The compact, 2×n polarization-independent optical component may be an optical switch selectably having a BAR state and a CROSS state, and in which case, the polarization-changing optical element includes a 0°/90° polarization rotator a control element that control the 0°/90° polarization rotator to provide a polarization rotation of 0° in the one of the BAR state and the CROSS state of the optical switch and a polarization rotation of 90° in the other of the BAR state and the CROSS state of the optical switch.

The compact, 2×n polarization-independent optical component may be four-port optical circulator, in which case, the polarization-changing optical element includes a serial arrangement of a Faraday rotator and a half-wave plate.

The compact, 2×n polarization-independent optical component may be a tunable add-drop filter, in which case, the polarization-changing optical element includes a serial arrangement of two half-wave plates and a two-channel acousto-optical tuneable filter located between the half-wave plates.

The second I/O port may include a first walk-off crystal and a second walk-off crystal. Optionally, the second I/O port may also include a third optical fibre and a lens. The first walk-off crystal has a first walk-off direction parallel to the walk-off directions of the walk-off crystals of one of the opposed walk-off crystal pairs of the first I/O port. The second walk-off crystal has a second walk-off direction orthogonal to the first walk-off direction. The third optical fibre is remote from the first I/O port. The lens is disposed between the first walk-off crystal and the third optical fibre at a location at which the lens forms an image of the core of one of the optical fibres on the core of the third optical fibre. With this embodiment of the second I/O port, the optical switch is a 2×1 optical switch, the optical circulator is a three-port optical circulator, and the tunable filter has either an ADD function or a DROP function.

Alternatively, the second I/O port may include a thick walk-off crystal and, optionally, a third optical fibre and a lens. The compact, 2×n polarization-independent optical component may additionally include a birefringent crystal disposed between the polarization rotating element and the second I/O port. The thick walk-off crystal has a first walk-off direction disposed at 45° to the walk-off directions of the walk-off crystals of one of the opposed walk-off crystal pairs of the first I/O port. The thick walk-off crystal has a thickness equal to the thickness of the opposed walk-off crystal pair, multiplied by the square root of two. The third optical fibre is located remotely relative to the first I/O port. The lens is disposed between the thick walk-off crystal and the third optical fibre at a location at which the lens forms an image of the core of one of the optical fibres on the core of the third optical fibre. With this embodiment of the second I/O port, the optical switch is a 2×1 optical switch and additionally includes a quarter wave plate, the optical circulator is a three-port optical circulator and lacks the quarter wave plate, and the tunable filter has either an ADD function or a DROP function, and lacks one of the quarter wave plates.

The invention additionally provides an input/output port for a compact, 2×n optical fibre-based optical component. The input/output port comprises two opposed walk-off crystal pairs, a capillary defining a bore, and two optical fibres housed in the bore of the capillary. Each opposed walk-off crystal pair includes two walk-off crystals. Each walk-off crystal has a walk-off direction and includes an attachment face substantially parallel to the walk-off direction, a first face orthogonal to the attachment faces, and a second face opposite the first face. The walk-off crystals are attached to one another with their attachment faces in contact and their walk-off directions opposed. The opposed walk-off directions of the walk-off crystals of the first opposed walk-off crystal pair and the opposed walk-off directions of the walk-off crystals of the second opposed walk-off crystal pair define opposite rotational directions. The opposed walk-off crystal pairs are attached to one another with the second face of one in contact of the first face of the other, and with the walk-off direction of the one orthogonal to the walk-off direction of the other. A first axis extends orthogonally to the first faces of the opposed walk-off crystal pairs from the intersection of the attachment faces of the opposed walk-off crystal pairs. The capillary is attached to the first face of the one of the opposed walk-off crystal pairs with the bore centered on, and longitudinally aligned with, the first axis. The optical fibres each have an optical axis, and are housed in parallel, inside, and in contact with, the bore of the capillary with a second axis, extending between the optical axes of the optical fibres, being aligned at substantially 45 degrees to the walk-off directions of the opposed walk-off crystal pairs.

The optical fibres are preferably thermally-diffused expanded core (TEC) optical fibres.

The optical axes of the optical fibres are separated by a separation amount, and each of the walk-off crystals has a thickness selected to provide a walk-off amount substantially equal to the separation amount divided by the square root of two.

Finally, the invention provides a method of making a compact, 2×n polarization-independent optical input/output port. In the method a first component block having a first handedness and a second component block having a second handedness are provided. The first component block includes a first walk-off crystal half having a first walk-off direction and a second walk-off crystal half having a second walk-off direction. The first crystal half is attached to the second crystal half with the first walk-off direction opposed to the second walk-off direction. The opposed first and second walk-off directions define a first rotational direction. The second component block includes a third walk-off crystal half having a third walk-off direction and a fourth walk-off crystal half having a fourth walk-off direction. The third crystal half is attached to the fourth walk-off crystal half with the third walk-off direction opposed to the fourth walk-off direction. The opposed third and fourth walk-off directions define a second rotational direction, opposite the first rotational direction. The first component block is divided in a direction orthogonal to the first and second walk-off directions to provide first opposed walk-off crystal pairs. The first opposed walk-off crystal pairs have the first handedness. The second component block is divided in a direction orthogonal to the third and fourth walk-off directions to provide second opposed walk-off crystal pairs. The second opposed walk-off crystal pairs have the second handedness. Finally, one of the first opposed walk-off crystal pairs is attached to one of the second opposed walk-off crystal pairs with the first and second walk-off directions orthogonal to the third and fourth walk-off directions, and the first rotational direction opposite to the second rotational direction.

The first component block and the second component block may be provided by providing a first walk-off crystal and a second walk-off crystal, each of which has four polished surfaces. Each walk-off crystal is divided lengthways to provide the first crystal half and the third crystal half from the first walk-off crystal and the second crystal half and the fourth crystal half from the second walk-off crystal. The first crystal half spatially corresponds to the second crystal half and the third crystal half spatially corresponds to the fourth crystal half. Each crystal half includes one of polished surfaces of the corresponding walk-off crystal and has a rough surface opposite the one of the polished surfaces. The first component block is formed by attaching the first crystal half to the second crystal half with the one of the polished surfaces of the first crystal half in contact with the one of the polished surfaces of the second crystal half, the first walk-off direction opposed to the second walk-off direction, and the first walk-off direction and the second walk-off direction defining the first rotational direction. The second component block is formed by attaching the third crystal half to the fourth crystal half with the one of the polished surfaces of the third crystal half in contact with the one of the polished surfaces of the fourth crystal half, the third walk-off direction opposed to the fourth walk-off direction, and the third walk-off direction and the fourth walk-off direction defining the second rotational direction, opposite the first rotational direction.

In the first component block and the second component block, the first walk-off crystal half is attached to the second walk-off crystal half at a first line of attachment, and the third walk-off crystal half is attached to the fourth walk-off crystal half at a second line of attachment. When one of the first opposed walk-off crystal pairs is attached to one of the second opposed walk-off crystal pairs, a second face of the one of the first opposed walk-off crystal pairs is attached to a first face of the one of the second opposed walk-off crystal pairs, and the first line of attachment intersects the second line of attachment at an intersection. A light alignment assembly as described above is provided and is attached to a first face of the one of the first opposed walk-off crystal pairs, opposite the second face of the one of the first opposed walk-off crystal pairs. The light alignment assembly is attached with the bore centered on the intersection and the first axis aligned at substantially 45 degrees to the walk-off directions of the opposed walk-off crystal pairs.

BRIEF DESCRIPTION OF THE DRAWINGS

FIGS. 3B, 3C and 3D are respectively a front view, a side view and a top view of the first input/output port of the second embodiment of the compact 2×2 optical component according to the invention shown in FIG. 3A.

FIG. 5B also shows the polarization components of the light beams X and Y at various points in the compact, polarization-independent, three-port optical circulator in both the forward and reverse directions of light transmission.

FIG. 5C also shows the polarization components of the light beams X and Y at various points in the compact, polarization-independent, three-port optical circulator in both the forward and reverse directions of light transmission.

DETAILED DESCRIPTION OF THE INVENTION

Figure 1A:
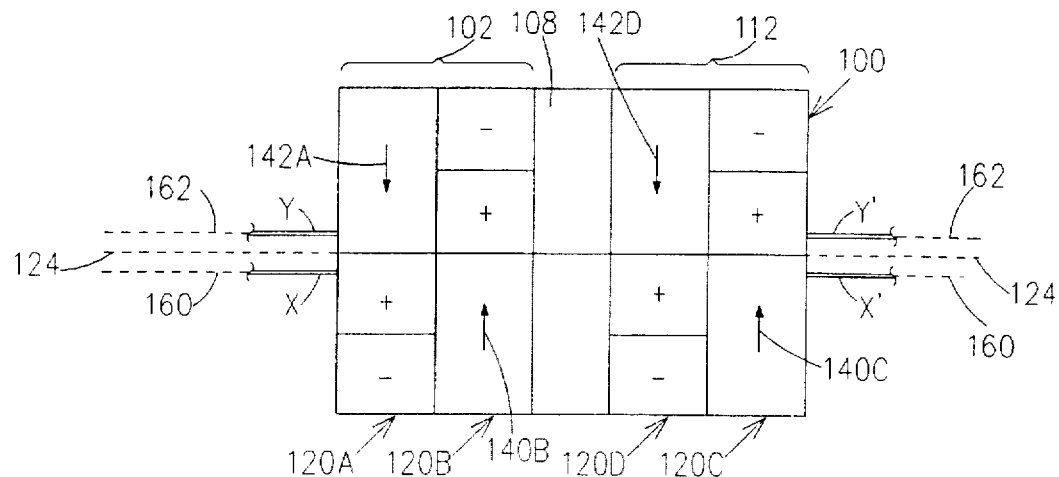
FIG. 1A is a top view of a first embodiment of a compact 2×2 optical component according to the invention.

FIG. 1A shows the general arrangement of a first embodiment 100 of a compact 2×n polarization-independent optical component according to the invention. The optical component 100 includes one, and preferably two, compact input/output (I/O) ports 102 and 112 according to the invention. In the optical component 100, the polarization-changing optical component 108 is sandwiched between the first I/O port 102 and the second I/O port 112.

In the example shown in FIGS. 1A–1E, the optical component 100 is a 2×2 optical component. The optical component 100 may be converted to a 2×1 or 1×2 optical component simply by not receiving one of the light beams X and Y, or by not transmitting one of the light beams X' and Y'. Alternatively, one of the simplified I/O ports 552 and 582 described below with reference to FIGS. 5B and 5C, respectively, may be substituted for either of the I/O ports 102 and 112. If the light beams are collimated as shown in FIGS. 1A–1D, the lens and optical fibre may be omitted from the I/O ports 552 and 582. In the following description the term 2×I will be understood to encompass both 2×1 and 1×2.

The compact 2×2 polarization-independent optical component 100 receives the two input light beams X and Y, and derives the two output light beams X' and Y', respectively, from them. The first I/O port 102, operating as an input port, separates the orthogonal polarization components of the light beams X and Y and transmits them to two new spatial locations, each displaced from the optical axes 160 and 162 of the light beams X and Y. The displacement of the orthogonal polarization components is such that one orthogonal polarization component of the light beam X is overlaid with the other orthogonal polarization component of the light beam Y at each spatial location. Thus, one orthogonal polarization component of each of the light beams X and Y is present at each displaced spatial location.

The polarization-changing optical element 108 is sandwiched between the first I/O port 102 and the second I/O port 112 and selectively changes the angle of polarization of the orthogonal polarization components it receives from one of the I/O ports by a predetermined amount, for example, by zero degrees or 90 degrees.

The polarization-changing optical element can be one of a number of different optical elements depending on the function of the compact optical component 100, as will be described in detail below.

The separated and overlaid orthogonal polarization components, modified by the polarization-changing optical element 108, then enter the second I/O port 112. The second I/O port laterally deviates the separated orthogonal polarization components of each light beam X and Y to recombine them at each of the optical axes 160 and 162 to form the light beams X' and Y'. If the polarization-changing optical element 108 changes the angle of polarization of the polarization components passing through it by 0°, the second I/O port emits light beams X' and Y' along the optical axes 160 and 162 of the light beams X and Y, respectively. On the other hand, if the polarization-changing optical element changes the angle of polarization of the polarization components passing through it by 90°, the second I/O port emits the light beams X' and Y' in inverted positions, i.e., along the optical axes 162 and 160 of the light beams Y and X, respectively. This enables the compact 2×2 optical component 100 to change the positions of the light beams X' and Y' relative to the optical axes of the light beams X and Y, and, as a result, to operate as an optical switch or optical circulator. Moreover, of the polarization-changing optical element changes the angle of polarization of one or more components of the light beams X and Y by 0° and other components of the light beams X and Y by 90°, the compact 2×2 optical component 100 will operate as a tuneable add/drop filter.

Figures 1B, 1C:
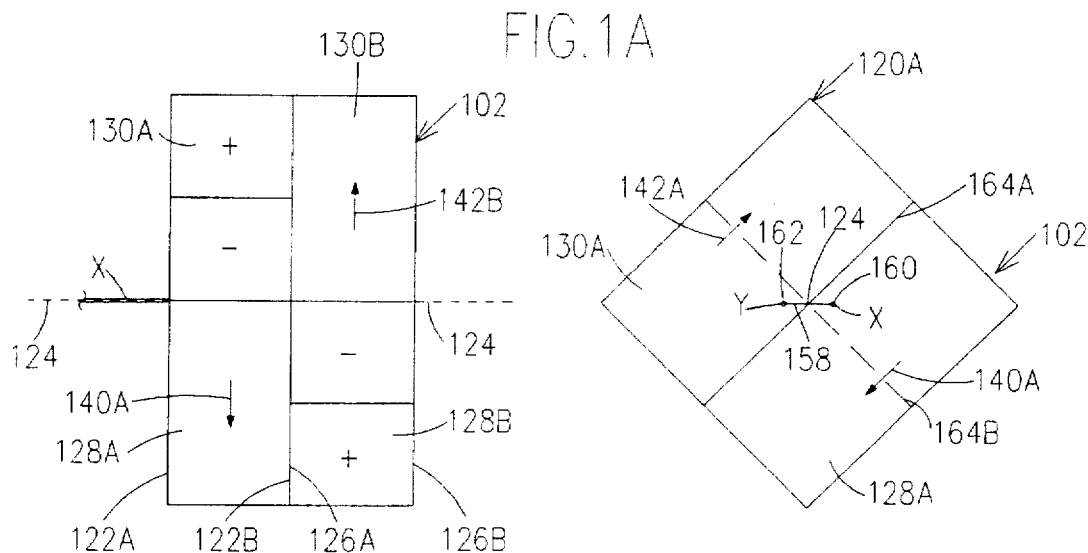
FIGS. 1B, 1C and 1D are respectively a front view, a side view and a top view of the first input/output port of the first embodiment of the compact 2×2 optical component according to the invention shown in FIG. 1A.
Figure 1D:
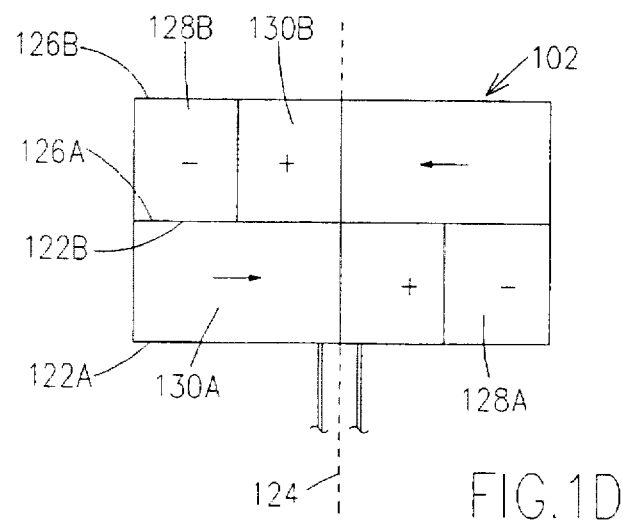

The first I/O port 102 will now be described in more detail with reference to the front, side and top views respectively shown in FIGS. 1B, 1C and 1D, and the rotated, exploded isometric view shown in FIG. 1E. The embodiment 112 of the second I/O port shown in FIG. 1A is structurally identical to the first I/O port 102 and has the same rotational orientation relative to the lateral axis 158. The lateral axis 158 extends perpendicularly from the optical axis 160 to the optical axis 162. The second I/O port will therefore not be fully described separately. The second I/O port looks different from the first I/O port in FIG. 1A because it is rotated through 180° about an axis perpendicular to the optical axis 124. The second I/O port 112 may alternatively be a mirror image of the first I/O port.

The first I/O port 102 is composed of the first opposed walk-off crystal pair 120A and the second opposed walk-off crystal pair 120B. The second I/O port 112 is composed of the first opposed walk-off crystal pair 120C and the second opposed walk-off crystal pair 120D. In the following description, corresponding elements of the opposed walk-off crystal pairs of the first I/O port and the second I/O port are indicated by the same reference numeral with the letter "A" added to indicate an element of the first opposed walk-off crystal pair of the first I/O port, the letter "B" added to indicate an element of the second opposed walk-off crystal pair of the first I/O port, the letter "C" added to indicate an element of the first opposed walk-off crystal pair of the second I/O port, and the letter "D" added to indicate an element of the second opposed walk-off crystal pair of the second I/O port. This disclosure refers to an element of all the opposed walk-off crystal pairs using the appropriate reference numeral without an added letter.

The first opposed walk-off crystal pair 120A and the second opposed walk-off crystal pair 120B are mirror images of one another, but are otherwise structurally identical to one another. Each of the opposed walk-off crystal pairs has a first face 122 and a second face 126, opposite the first face. The first opposed walk-off crystal pair 120A and the second opposed walk-off crystal pair 120B are attached to one another with the second face 126A of the first opposed walk-off crystal pair contacting the first face 122B of the second opposed walk-off crystal pair 120B. The first opposed walk-off crystal pair and the second opposed walk-off crystal pair are rotationally oriented relative to one another such that the walk-off directions 140A and 142A of the first opposed walk-off crystal pair are orthogonal to the walk-off directions 140B and 142B of the second opposed walk-off crystal pair. The first opposed walk-off crystal pair and the second opposed walk-off crystal pair are also rotationally oriented relative to one another such that the walk-off directions of the first opposed walk-off crystal pair.

Figure 1E:
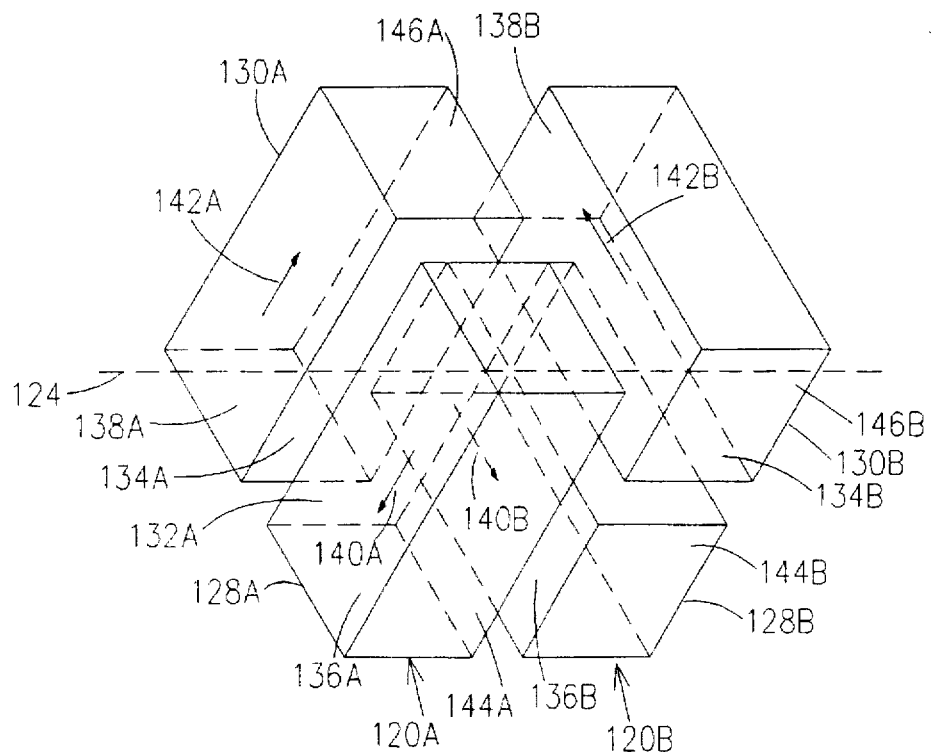
FIG. 1E is an exploded isometric view of the first and second opposed walk-off crystal pairs constituting at least part of the input/output ports of the compact 2×2 optical components according to the invention.
Figure 1F:
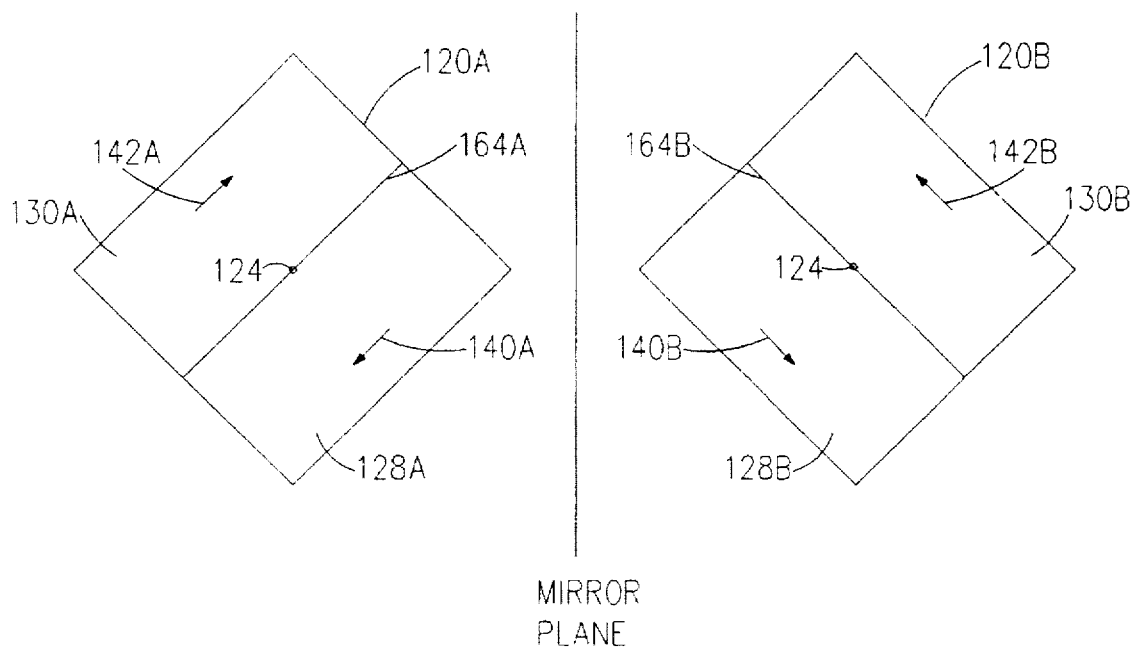
FIG. 1F shows an example of the mirror plane about which the second walk-off crystal pair is a mirror image of the first walk-off crystal pair.

It can be seen from FIG. 1E that the opposed walk-off crystal pair 120B is a mirror image of the opposed walk-off crystal pair 120A about the mirror plane shown in FIG 1F. The walk-off directions 140A and 142A of the walk-off crystals 128A and 130A, respectively, of the opposed walk-off crystal pair define a first rotational direction about the optical axis 124. In the example shown, the first rotational direction is clockwise. It can also be seen that the walk-off directions 140B and 142B of the walk-off crystals 128B and 130B, respectively, of the opposed walk-off crystal pair 120B define a second rotational direction about the optical axis 124, opposite to the first rotational direction. In the example shown, the second rotational direction is anti-clockwise. If the opposed walk-off crystal pair 120B is identical to the opposed walk-off crystal pair 120A, instead of being a mirror image, and the rotational direction defined by the walk-off directions of the opposed walk-off crystal pair 120B is the same as that defined by the walk-off directions of the opposed walk-off crystal pair 120A, the opposed walk-off crystal pair 120B further separates the orthogonal polarization components of the light beams X and Y instead of overlaying them at the two displaced locations.

The first I/O port is aligned relative to the light beams X and Y and the polarization-changing element 108 such that the first face 122A of the first opposed walk-off crystal pair 120A receives the light beams, and the second face 126B of the second opposed walk-off crystal pair contacts the polarization-changing optical element 108 (FIG. 1A). The first and second faces may optionally be coated with a suitable anti-reflective coating (not shown).

FIG. 1E shows an isometric view of the first and second opposed walk-off crystal pairs 120A and 120B. The first and second opposed walk-off crystal pairs have then been exploded relative to one another along the optical axis, and the walk-off crystals 128A, 130A, 128B and 130B constituting the opposed walk-off crystal pairs have been exploded away from the optical axis 124. The structure of the opposed walk-off crystal pairs will now be described with reference to FIGS. 1B–1E.

Each opposed walk-off crystal pair 120 includes the first walk-off crystal 128 and the second walk-off crystal 130. The first and second walk-off crystals each include a first face 136 and 138, respectively, and a second face 144 and 146, respectively, parallel to the first face. The first and second faces are preferably the major faces of the walk-off crystals. The first faces 136 and 138 collectively constitute the first face 122 of each opposed walk-off crystal pair. The second faces 144 and 146 collectively constitute the second face 126 of each opposed walk-off crystal pair. The first and second walk-off crystals also each include an attachment face 132 and 134, respectively, parallel to their walk-off directions and orthogonal to their first and second faces. The first and second walk-off crystals are attached to one another with their respective attachment faces 132 and 134 in contact with one another at the line of attachment 164, and with their walk-off directions opposed.

When the first and second opposed walk-off crystal pairs 120A and 120B are attached to one another to form the I/O port 102, for example, the optical axis 124 of the I/O port passes through the intersection of the line of attachment 164A of the first opposed walk-off crystal pair and the line of attachment 164B of the second opposed walk-off crystal pair, and is perpendicular to the plane of the faces 122A, 122B, 126A and 126B.

The walk-off directions of the first and second walk-off crystals 128 and 130 are indicated by the arrows 140 and 142, respectively. The walk-off directions of the walk-off crystals are additionally or alternatively indicated by "+" and "−" symbols. The walk-off direction is from the "−" symbol towards the "+" symbol. The walk-off directions shown are the walk-off directions for light passing from the first face 122 to the second face 126 of the opposed walk-off crystal pair. As will be described in more detail below with reference to FIGS. 2A–2J, the walk-off directions for light passing through the opposed walk-off crystal pair from the second face to the first face are opposite to those shown.

The light beams X and Y impinge on the first face 122A of the first opposed walk-off crystal pair 120A of the first I/O port 102. The first I/O port is mounted relative to the light beams X and Y such that the first face 122A is perpendicular to the respective optical axes 160 and 162 of the light beams, and the lateral axis 158 extending between the optical axes 160 and 162, is centered on the optical axis 124. The first I/O port is rotationally oriented relative to the light beams X and Y such that the lateral axis 158 is angled at ±45° to the line of attachment 164A, as shown in FIG. 1B.

Aligning the first I/O port relative to the light beams X and Y as just described aligns the lateral axis 158 at ±45° to the walk-off directions of the walk-off crystals 128A and 130A constituting the first opposed walk-off crystal pair 120A, and is aligned at ±45° to the walk-off directions of the walk-off crystals 128B and 130B constituting the second opposed walk-off crystal pair 120B. The light beams X and Y impinge on the first opposed walk-off crystal pair at points that are inset equally from the line of attachment 164A. Finally, the light beam X passes through the walk-off crystal 128& whereas the light beam Y passes through the walk-off crystal 130A.

The thickness of the walk-off crystals 128 and 130 constituting the opposed walk-off crystal pairs 120 is selected to give a walk-off amount approximately equal to the lateral distance between the light beams X and Y divided by √2. For example, in an embodiment in which the distance between the optical axes 160 and 162 of the light beams X and Y is 125 μm, the required walk-off amount through the thickness of each opposed walk-off crystal pair is about 88.5 μm. With this walk-off amount, at the second face 126A of the first opposed walk-off crystal pair 120A, the two deviated polarization components and the two non-deviated polarization components are located at the opposite corners of a square having a diagonal equal in length to the spacing between the light beams X and Y. Rutile (titanium dioxide (TiO$_2$)) or yttrium vanadate (YVO$_4$) walk-off crystals about 0.885 mm thick provide this amount of walk-off. The other dimensions of the walk-off crystals are uncritical. In a practical embodiment, walk-off crystals 128 and 130 had a length of about 1 mm and a width of about 0.5 min.

The preferred material of the walk-off crystals 128 and 130 is rutile. Its refractive index is greater than that of YVO$_4$, so it has a smaller in vacuo path length for a given walk-off amount. A smaller path length results in less lateral spreading of the polarization components as they pass through the opposed walk-off crystal pairs.

If the light beams X and Y spread laterally as they enter the first I/O port 102, the polarization-changing optical element 108 includes an imaging lens (not shown). An image of where the light beams X and Y impinge on the first face 122A of the first opposed walk-off crystal pair 120A of the first I/O port is formed by the imaging lens on the first face 122C of the first opposed walk-off crystal pair of the second I/O port 122. However, the optical component 100 is inherently inverting when it includes an imaging lens, so that when the polarization-changing element 108 changes the angle of polarization by 0°, the light beam X' is aligned with the optical axis 162 of the light beam Y and the light beam Y' is aligned with the optical axis 160 of the light beam X.

As will be described in greater detail below, the cost of making the compact 2×n optical component 100 using the I/O ports 102 and 112 is substantially reduced compared with making conventional optical components with the same function. This is because the small size and compact construction the I/O ports 102 and 112 enable the optical component 100 to be very small. The I/O ports 102 and 112 are made very small by minimizing the walk-off amount required. This, in turn, reduces the thickness, and, hence, the other dimensions, of the walk-off crystals. The walk-off amount is reduced by significantly reducing the spacing between the light beams X and Y. However, lateral spreading of the polarization components as they pass through the opposed walk-off crystal pairs sets a practical limit on how closely the light beams can be spaced. If the polarization components spread laterally to such an extent that they intersect the line of attachment 164 between the walk-off crystals, diffraction effects at the line of attachment and interaction between the polarization components will seriously impair the performance of the optical component. In the preferred embodiments of the invention, the clearance between the line of attachment and the optical axis of the light beams is only about 60 μm. Hence, lateral spreading of the light beams must be less than this clearance.

When used as part of an optical assembly, the compact 2×n optical component 100 has to be mounted relative to the light beams X and Y in the spatial and rotational relationship described above. This may be done, for example, by mounting the optical component 100 and other optical elements of the optical assembly on a micro-bench formed of single-crystal silicon. Aligning the optical component 100 may be made easier by forming a V-shaped groove in the silicon wafer by anisotropic etching. The groove is dimensioned to receive one corner of the opposed walk-off crystal pairs 120. The corner is inserted into the groove, the optical component is rotationally aligned about the corner, and is glued in place using a suitable adhesive.

The operation of the compact 2×2 optical component 100 will now be described with reference to FIGS. 2A–2J. FIGS. 2B–2J show the polarization components of the light beams X and Y at various points in the optical component 100 indicated by the section lines 2B—2B through 2J—2J in FIG. 2A. FIGS. 2E–2G show the polarization components at the indicated points in the second I/O port 112 when the polarization-changing optical element 108 rotates the angle of polarization of light passing through it through 0°. FIGS. 2H–2J show the polarization components at the indicated points in the second I/O port when the polarization-changing optical element rotates the angle of polarization of light passing through it through 90°.

Figure 2A:
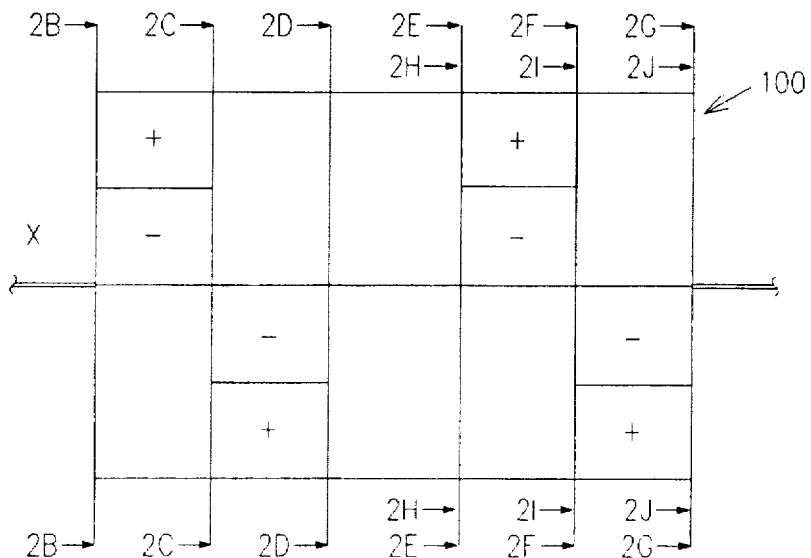
FIG. 2A is another top view of a first embodiment of a compact 2×2 optical component according to the invention.
Figure 2B:
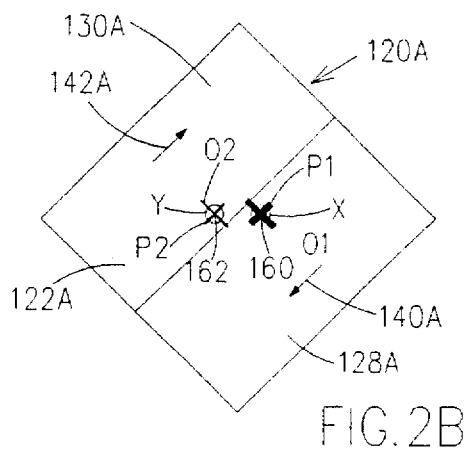
FIGS. 2B–2J show the polarization components of the light beams X and Y at various points in the compact 2×n optical component indicated by the section lines 2B–2B through 2J—2J in FIG. 2A.

FIG. 2B shows the light beams X and Y at the first face 122A of the first opposed walk-off crystal pair 120A. Each of the light beams X and Y is shown as having an orthogonal polarization component O and a parallel polarization component P. The orthogonal polarization component O and the parallel polarization component P are respectively orthogonal and parallel to the walk-off directions 140A and 142A of the first opposed walk-off crystal pair 120A of the first I/O port 102. The orthogonal polarization component O and the parallel polarization component P are respectively parallel and orthogonal to the walk-off directions 140B and 142B of the second opposed walk-off crystal pair 120B.

In the Figures, the orthogonal and parallel polarization components of the light beam X are represented by the thick bars O1 and P1, respectively, and those of the light beam Y are represented by the bars lines O2 and P2, respectively. The orthogonal polarization components O1 and O2 are represented by the longer bars and the parallel polarization components P1 and P2 are represented by the shorter bars.

The orthogonal and parallel polarization components O1 and P1 of the light beam X enter the walk-off crystal 128A of the first opposed walk-off crystal pair 120A and the orthogonal and parallel polarization components O2 and P2 of the light beam Y enter the walk-off crystal 130A. In the first opposed walk-off crystal pair, the orthogonal polarization components O1 and O2 of the light beams X and Y are respectively orthogonal to the walk-off directions 140A and 142A of the walk-off crystals 128A and 130A, and pass through the first opposed walk-off crystal pair without deviation. However, the parallel polarization components P1 and P2 are respectively parallel to the walk-off directions 140A and 140B of the walk-off crystals 128A and 130A. The walk-off crystals 128A and 128B respectively deviate the parallel polarization components in their walk-off directions. Since their walk-off directions are opposed, the walk-off crystals deviate the parallel polarization components in opposite directions.

Figure 2C:
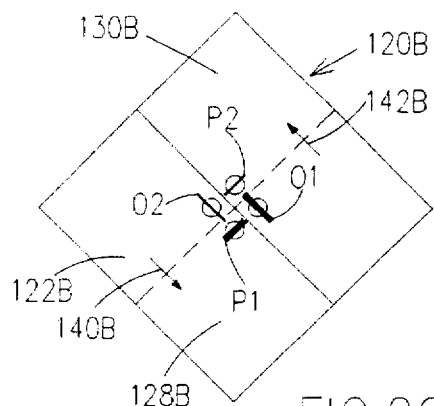

FIG. 2C shows the polarization components of the light beams X and Y as they enter the second opposed walk-off crystal pair 120B. At the first face 122B of the second opposed walk-off crystal pair 120B, the parallel polarization components P1 and P2 are respectively located at the displaced locations 170 and 172. Relative to the orthogonal polarization components O1 and O2, the locations 170 and 172 are displaced by the walk-off amount of the first opposed walk-off crystal pair in the walk-off directions 140A and 140B, respectively.

The parallel polarization component P1 of the light beam X and the orthogonal polarization component O2 of the light beam Y enter the walk-off crystal 128B of the second opposed walk-off crystal pair 120B. The parallel polarization component P2 of the light beam Y and the orthogonal polarization component O1 of the light beam X enter the walk-off crystal 130B.

In the second opposed walk-off crystal pair 120B, the parallel polarization components P1 and P2 are both orthogonal to the walk-off directions 140B and 142B of the walk-off crystals 128B and 130B, and pass through these walk-off crystals without further deviation. However, the orthogonal polarization components O2 and O1 are respectively parallel to the walk-off directions 140B and 142B of the walk-off crystals 128B and 130B. The walk-off crystals 128B and 130B respectively deviate the orthogonal polarization components O2 and O1 in their walk-off directions. Since their walk-off directions are opposed, the walk-off crystals deviate the orthogonal polarization components in opposite directions.

Figure 2D:
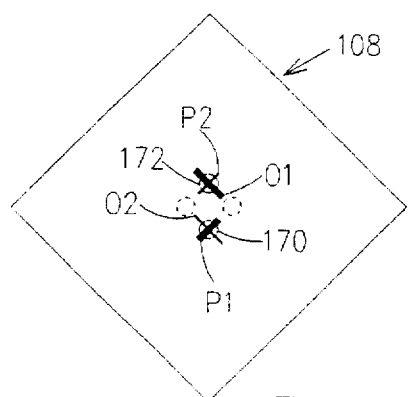
Figure 2E:
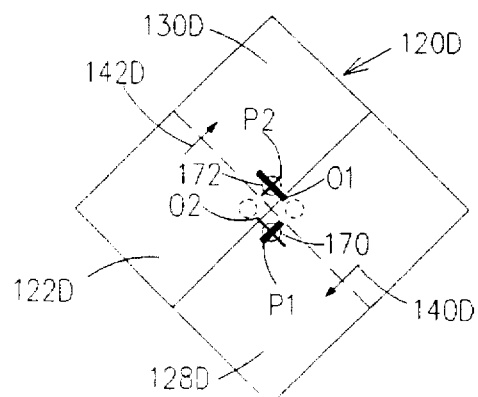
Figure 2F:
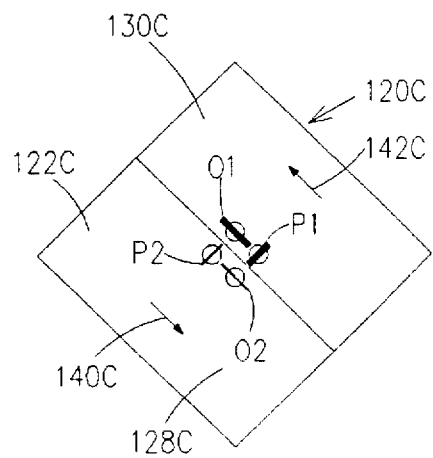
Figure 2G:
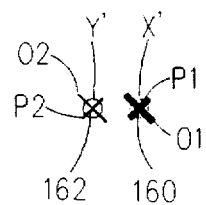
Figure 2H:
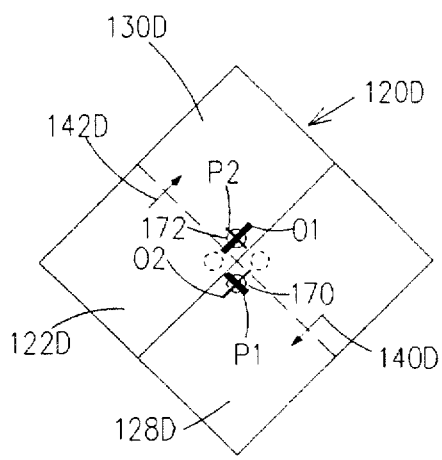
Figure 2I:
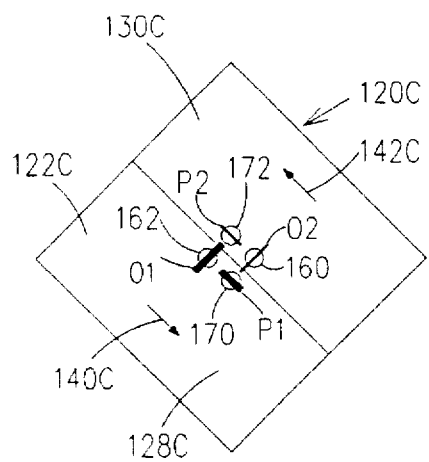
Figure 2J:
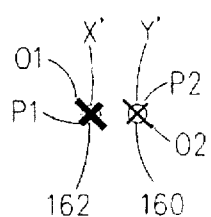

FIG. 2D shows the polarization components of the light beams X and Y as they enter the polarization-rotating optical element 108. The parallel polarization component P1 of the light beam X and the orthogonal polarization component O2 of the light beam Y are overlaid at the displaced location 170, and the orthogonal polarization component O1 of the light beam X and the parallel polarization component P2 of the light beam Y are overlaid at the displaced location 172.

FIGS. 2E–2G show how the 2×2 optical component 100 leaves the positions of the light beams X' and Y' unchanged when the polarization-changing optical element 108 rotates the angle of polarization of light passing through it through 0°. FIG. 2E shows the polarization components after they have passed through the polarization-changing optical element in this state.

The parallel polarization component P1 of the light beam X and the orthogonal polarization component O2 of the light beam Y enter the walk-off crystal 128D of the second opposed walk-off crystal pair 120D of the second I/O port 112. The parallel polarization component P2 of the light beam Y and the orthogonal polarization component O1 of the light beam X enter the walk-off crystal 130D of the second opposed walk-off crystal pair 120D.

In the second opposed walk-off crystal pair 120D, the orthogonal polarization components O2 and O1 are orthogonal to the walk-off directions 140D and 142D of the walk-off crystals 128D and 130D, respectively, and pass through these walk-off crystals without deviation. However, the parallel polarization components P1 and P2 are respectively parallel to the walk-off directions 140D and 142D of the walk-off crystals 128D and 130D. The walk-off crystals 128D and 130D deviate the parallel polarization components in directions opposite to their respective walk-off directions.

The walk-off crystals of the second opposed walk-off crystal pair 120D and of the first opposed walk-off crystal pair 120C deviate the polarization components in directions opposite to their walk-off directions because the polarization components pass through the opposed walk-off crystal pairs 120D and 120C from their respective second faces to their respective first faces. Therefore, the opposed walk-off crystal pairs in the second I/O port deviate the polarization components oriented parallel to their walk-off directions in directions opposite to their walk-off directions.

FIG. 2F shows the polarization components of the light beams X and Y as they enter the second face 126C of the first opposed walk-off crystal pair 120C. At the second face, the locations of the parallel polarization components P1 and P2 respectively coincide with those of the optical axes 160 and 162 of the light beams X and Y, while the orthogonal polarization components O1 and O2 remain at the displaced locations 170 and 172, respectively.

In the first opposed walk-off crystal pair 120C, the parallel polarization components P2 and P1 are respectively orthogonal to the walk-off directions 140C and 142C of the walk-off crystals 128C and 130C, and therefore pass through these crystals without further deviation. However, the orthogonal polarization components O2 and O1 are parallel to the walk-off directions 140C and 142C, respectively. The walk-off crystals 128C and 130C deviate the orthogonal polarization components O2 and O1 in directions opposite to the respective walk-off directions.

FIG. 2G shows the polarization components of the light beams X and Y at the first face 122C of the first opposed walk-off crystal pair 120C. Here, the orthogonal polarization component O1 and the parallel polarization component P1 of the light beam X are overlaid at the position of the optical axis 160 of the light beam X and constitute the light beam X'. The orthogonal polarization component O2 and the parallel polarization component P2 of the light beam Y are overlaid at the position of the optical axis 162 of the light beam Y and constitute the light beam Y'.

Thus, when the polarization-changing optical element 108 does not change the angle of polarization of the light passing through it, the action of the second I/O port 112 is complementary to that of the first I/O port 102, and the compact 2×n optical component 100 transmits the light beam X' derived from the light beam X the along the optical axis 160, and transmits the light beam Y' derived from the light beam Y along the optical axis 162. The light beams X' and Y' have the same spatial, directional and polarization relationship to one another as the light beams X and Y.

FIGS. 2H–2J show how the 2×2 optical component 100 inverts the positions of the light beams X' and Y' when the polarization-changing optical element 108 rotates the angle of polarization of the light passing through it through 90°. The polarization rotation provided by the polarization rotating optical element has no effect on the polarization components of the light beams X and Y as they through the first I/O port 102 in the forward direction. Therefore, when the polarization-changing optical element 108 rotates the angle of polarization of the light passing through it through 90°, the polarization components of the light beams X and Y pass through the first I/O port as described above with reference to FIGS. 2B–2D, and the angles of polarization of the polarization components leaving the first I/O port are as shown in FIG. 2D.

FIG. 2H shows the polarization components O1, P1, O2 and P2 as they enter the second I/O port 112 from the polarization-rotating optical element 108. The angles of polarization of the polarization components are rotated by 90° relative to those shown in FIG. 2D.

The parallel polarization component P1 of the light beam X and the orthogonal polarization component O2 of the light beam Y enter the walk-off crystal 128D of the second opposed walk-off crystal pair 120D. The parallel polarization component P2 of the light beam Y and the orthogonal polarization component O1 of the light beam X enter the walk-off crystal 130D of the second opposed walk-off crystal pair 120D.

In the second opposed walk-off crystal pair 120D, the parallel polarization components P1 and P2 are respectively orthogonal to the walk-off directions 140D and 142D of the walk-off crystals 128D and 130D, and therefore pass through these crystals without deviation. However, the orthogonal polarization components O2 and O1 are parallel to the walk-off directions of the walk-off crystals 128D and 130D, respectively. The walk-off crystals 128D and 130D deviate the orthogonal polarization components in directions opposite to their respective walk-off directions.

FIG. 2I shows the polarization components of the light beams X and Y at the second face of the second opposed walk-off crystal pair 120D. At the second face, the locations of the orthogonal polarization components O1 and O2 respectively coincide with those of the optical axes 1620 and 160 of the light beams X and Y, while the parallel components P1 and P2 remain at the displaced locations 170 and 172, respectively.

In the first opposed walk-off crystal pair 120C, the orthogonal polarization components O2 and O1 are respectively orthogonal to the walk-off directions 140C and 142C of the walk-off crystals 128C and 130C, and therefore pass through the first opposed walk-off crystal pair without further deviation. However, the parallel polarization components P1 and P2 are parallel to the walk-off directions of the walk-off crystals 128C and 130C. The walk-off crystals 128C and 130C deviate the parallel polarization components in directions opposite to the respective walk-off directions.

FIG. 2J shows the polarization components of the light beams X and Y at the first face of the first opposed walk-off crystal pair 120C of the second I/O port 112. Here, the orthogonal polarization component O1 and the parallel polarization component P1 of the light beam X are overlaid at the position of the optical axis 160 of the light beam Y, and constitute the light beam X'. The orthogonal polarization component O2 and the parallel polarization component P2 of the light beam Y are overlaid at the position of the optical axis 160 of the light beam X, and constitute the light beam Y'.

Thus, when the polarization-changing optical element 108 changes the angle of polarization of the light passing through it by 90°, the action of the second I/O port 112 is not complementary to that of the first I/O port 102, and the compact 2×n optical component 100 transmits the light beam X' derived from the light beam X along the optical axis 162, and transmits the light beam Y' derived from the light beam Y along the optical axis 160. In the following descriptions, the compact 2×n optical component 100 will be said to be non-inverting with respect to a light beam when it transmits the light beam on the same optical axis on which it receives the light beam, and will be said to be inverting with respect to the light beam when it transmits the light beam on the optical axis of the other light beam The compact 2×n optical component 100 is bidirectional. The second I/O port 112 can operate as an input port and the first I/O port 102 can operate as an output port. In this case, the light beam X is received by the second I/O port, acting as an input port, and is transmitted as the light beam X' by the first I/O port, acting as an output port. The light beam Y is received by the second I/O port, acting as an input port, and is transmitted as the light beam Y' by the first I/O port, acting as an output port. When the polarization-changing optical element 108 does not change the angle of polarization of the light passing through it, the first I/O port transmits the light beam X' along the optical axis 160 and transmits the light beam Y' along the optical axis 162. When the polarization-changing optical element 108 changes the angle of polarization of the light passing through it by 90°, the first I/O port transmits the light beam X' along the optical axis 162 and transmits the light beam Y' along the optical axis 160.

As noted above, the I/O ports used in the compact 2×n optical component 100 are preferably made by forming a component block by attaching large elements together. The component block is then divided to provide multiple small I/O ports. This substantially reduces the cost of making the I/O ports because the large elements are easy to handle, and the cost of precisely aligning the large elements is divided among the number of small I/O ports made by dividing each component block. However, when the optical component 100 is installed as a component of an optical assembly (not shown), the light beams X and Y impinging on the optical component 100 must be accurately aligned relative to one another, and the optical component must be accurately aligned spatially and rotationally relative to the light beams X and Y. Moreover, other optical elements in the optical assembly that receive the light beams X' and Y' must be accurately aligned relative to these light beams.

Figure 3A:
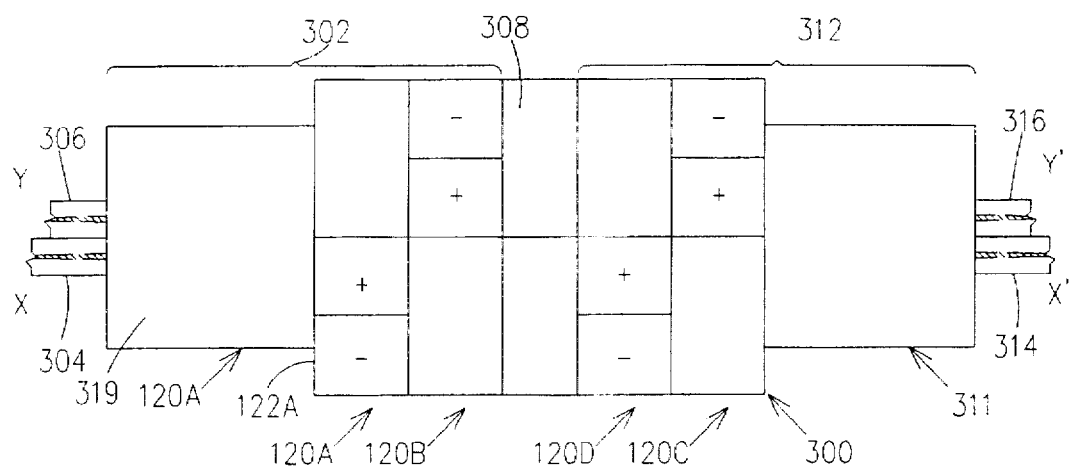
FIG. 3A is a top view of a second embodiment of a compact 2×2 optical component according to the invention.

FIG. 3A shows a top view a second embodiment 300 of the compact 2×n optical component according to the invention. Elements of the second embodiment 300 corresponding to those of the embodiment 100 shown in FIGS. 1A–1E are indicated using the same reference numerals, and will not be described in detail here. In the second embodiment, the I/O ports 302 and 312 are pre-aligned in the factory relative to the light beams X and Y and the light beams X' and Y'. This eliminates the need to align the optical component incorporating the I/O ports relative to the light beams X and Y and eliminates the need to align other optical elements relative to the light beams X' and Y' when the optical component is installed in an optical assembly.

In the example shown in FIGS. 3A–3E, the optical component 300 is a 2×2 optical component. The optical component 300 may be converted to a 2×1 optical component simply by omitting one of the optical fibres 304, 306, 3 14 and 316, or by not connecting the distal end of one of these optical fibres. Alternatively, one of the simplified I/O ports 552 and 582 described below with reference to FIGS. 5B and 5C, respectively, may be substituted for either of the I/O ports 302 and 312.

The compact 2×n optical component 300 includes one, and preferably two, compact, optical fibre-based, input/output (I/O) ports 302 and 312 according to the invention. The optical component 300 also includes the polarization-changing optical element 308 located between the first I/O input port and the second I/O port 312. The I/O port 302 includes the first and second opposed walk-off crystal pairs 120A and 120B, and additionally includes the light coupling assembly 310 that enables the light beams X and Y, transmitted via the optical fibres 304 and 306, respectively, to be factory pre-aligned relative to the opposed walk-off crystal pairs 120A and 120B. The second I/O port 312 includes the light coupling assembly 311. The light coupling assembly 311 enables the light beams X' and Y', transmitted via the optical fibres 314 and 316, respectively, to be factory pre-aligned relative to the opposed walk-off crystal pairs 120C and 120D.

The compact 2×n polarization-independent optical component 300 receives the two input light beams X and Y via the optical fibres 304 and 306 coupled to the first I/O port 302 by the light coupling assembly 310, derives the two output light beams X' and Y' from the light beams X and Y, and feeds the light beams X' and Y' out via the optical fibres 3 14 and 316 coupled to the second I/O port 312 by the light coupling assembly 311. In the first I/O port 302, the optical fibres 304 and 306 are mounted in the bore 318 of the capillary 319 to form the light coupling assembly 310. The light coupling assembly is spatially and rotationally aligned relative to the front face 122A of the first opposed walk-off crystal pair 120A constituting part of the first I/O port 302, and then is attached to the front face 122A. This simply and accurately defines the alignment and spacing of the light beams X and Y relative to one another and relative to the first and second opposed walk-off crystal pairs 120A and 120B. The construction of the second I/O port 312 is similar.

The operation of the compact 2×n optical component 300 on the light beams X and Y is identical to that of the first embodiment 100 of the compact 2×n optical component described above with reference to FIGS. 1A–1E and 2A–2J, and will not be described in detail here.

As in the first embodiment, the polarization-changing optical element 308 located between the first I/O port 302 and the second I/O port 3 12, and selectively changes the angle of polarization of the polarization components of light it receives via one of the I/O ports by a predetermined amount. For example, the polarization-changing optical element may change the angle of polarization by zero degrees or 90 degrees. The polarization-changing optical element can be one of a number of different optical elements depending on the function of the compact 2×n optical component 300, as will be described in detail below with reference to FIGS. 4, 5A–5C, 6A and 6B. The structure just described forms the basis of such compact 2×n polarization-independent optical components as optical circulators, optical switches, and tunable add-drop filters.

The first I/O port 302 will now be described in more detail with reference to FIGS. 3B–3D, which show front, top and side views of the first I/O port 302, and also to FIG. 1E. The second I/O port 312 shown in FIG. 3A is structurally identical to the first I/O port 302 and has the same rotational orientation relative to the lateral axis 158. The second I/O port will therefore not be fully described separately. The second I/O port looks different from the first I/O port in FIG. 3A because it is rotated through 180° about an axis perpendicular to the optical axis 124. The second I/O port 312 may alternatively be a mirror image of the first I/O port.

The first I/O port 302 includes the first opposed walk-off crystal pair 120A, the second opposed walk-off crystal pair 120B, and the light coupling assembly 310. The second I/O port 312 includes the first opposed walk-off crystal pair 120C, the second opposed walk-off crystal pair 120D, and the light coupling assembly 311. The opposed walk-off crystal pairs 120 are identical to the opposed walk-off crystal pairs described above with respect to FIGS. 1A–1E, and are attached to one another in the same way.

FIGS. 3B–3D also show details of the optical fibres 304 and 306. The optical fibres 304 and 306 are both thermally-diffused, expanded-core (TEC) single-mode optical fibres and are housed in the bore 318 of the capillary 319. The optical fibre 304 will be described in detail. The optical fibres 306, 314 and 316 are identical, and will not be described. The optical fibre 304 is a TEC optical fibre in which the core 350 of the fibre has a substantially constant diameter over most of the length of the fibre. A small part of constant-diameter portion of the optical fibre is indicated by the reference numeral 352 in FIG. 3D. In the region 354, adjacent the end 356 of the optical fibre where the optical fibre abuts the first opposed walk-off crystal pair 120A, the diameter of the core progressively expands by a factor typically in the range of 3–5 to reach a maximum diameter at the end 356 of the fibre. The region 354 typically has a length in the range of 4–6 mm.

The expanded core 350 of the TEC optical fibre 304 substantially reduces the angle at which the light emitted from the end 356 of the fibre spreads laterally compared with a conventional optical fibre. A typical reduction is a factor of about four. This property of the TEC optical fibre enables the spacing between the light beams to be minimized without the risk of the polarization components intersecting one another or the line of attachment 164 between the walk-off crystals 128 and 130 as they pass through the opposed walk-off crystal pairs. As described above, minimizing the spacing between the light beams enables the size and cost of the I/O ports to be significantly reduced.

The low lateral spread of the light beam emitted by a TEC optical fibre offers the possibility of eliminating the need to converge the light emitted by the optical fibre 304 on the optical fibre 314. However, notwithstanding the small lateral beam spread obtained with present TEC optical fibres, not converging the light causes a substantial intensity loss. Therefore, in each of the embodiments shown in FIGS. 3A, 4, and 5A–5C, the polarization-changing elements 308, 408, and 508 all preferably include an imaging lens system (not shown). The imaging lens system forms an image of the ends of the cores of the optical fibres 304 and 306 on the ends of the cores of the optical fibres 314 and 314. However, the compact 2×n optical component 300 becomes inherently inverting when it includes a single convex lens as the imaging lens system. In other words, when the polarization-changing element 308 changes the angle of polarization by 0°, the optical component transmits the light beam X received via the optical fibre 304 to the optical fibre 316 as the light beam X', and transmits the light beam Y received via the optical fibre 306 to the optical fibre 314 as the light beam Y'. However, the optical component can be made non-inverting for example by exchanging the ends of the optical fibres 314 and 316 remote from the light alignment assembly 311.

In the preferred embodiment, the optical fibres 304 and 306 each have an outside diameter of 125 µm, the diameter of the constant-diameter region of the core is about 10 µm, the maximum diameter of the core is about 40 µm, and the length over which the core expands from its constant diameter to its maximum diameter is about 1 mm. With this arrangement, the radius of the light beam increases from about 20 µm at the first face of the first opposed walk-off crystal pair to about 37 µm at the second face of the second opposed walk-off crystal pair. This maintains an adequate clearance between the maximum radius of the light beam and the line of attachment between the walk-off crystals. In a perfectly-aligned I/O port, the line of attachment is about 62 µm from the center of the light beam.

The two optical fibres 304 and 306 coupled to the first I/O port 302 are mounted in the bore 318 of the capillary 319. The internal diameter of the bore 319 is a few microns greater than the sum of the outside diameters of the optical fibres 304 and 306. A bore with this diameter relationship to the outside diameters of the optical fibres accommodates and accurately locates the optical fibres parallel to one another. Inserting the optical fibres, which have a known and accurately-defined outside diameter, into the bore of the capillary, which has a known and precisely-defined internal diameter, aligns the optical axes 360 and 362 of the optical fibres accurately parallel to one another and precisely defines the distance between the optical axes of the optical fibres. In the preferred embodiment, the capillary 319 has an outside diameter of 1 mm, a length of 10 mm and its bore has a diameter of 254 µm. The diameter of the bore is four microns larger than the sum of the outside diameters of the optical fibres 304 and 306.

The light coupling assembly 310 is attached to the first face 122A of the first opposed walk-off crystal pair 120A. The light coupling assembly is attached to the first face with the capillary centered on the optical axis 124 of the first and second opposed walk-off crystal pairs 120A and 120B. The light coupling assembly is angularly oriented relative to the first and second opposed walk-off crystal pairs such that the lateral axis 158 that interconnects the optical axes 360 and 362 of the optical fibres 304 and 306, respectively, is angled at ±45° to the line of attachment 164A between the first walk-off crystal 128A and the second walk-off crystal 130A.

The alignment just described aligns the lateral axis 158 at ±45° to the walk-off directions 140A and 142A of the walk-off crystals 128A and 130A constituting the first opposed walk-off crystal pair, and aligns the lateral axis at ∓45° to the walk-off directions 140B and 142B of the walk-off crystals 128B and 130B constituting the second opposed walk-off crystal 120B. The optical axes 360 and 362 of the optical fibres 304 and 306, respectively, are inset equally from the line of attachment 164A. The light beam X, received via the optical fibre 304, passes into the walk-off crystal 128A, whereas the light beam Y, received via the optical fibre 306, passes into the walk-off crystal 130A.

A way in which the light coupling assembly 310 is aligned relative to the first walk-off crystal pair 120A and the second opposed walk-off crystal pair 120B will be described below with reference to FIGS. 8A and 8B.

Figure 4:
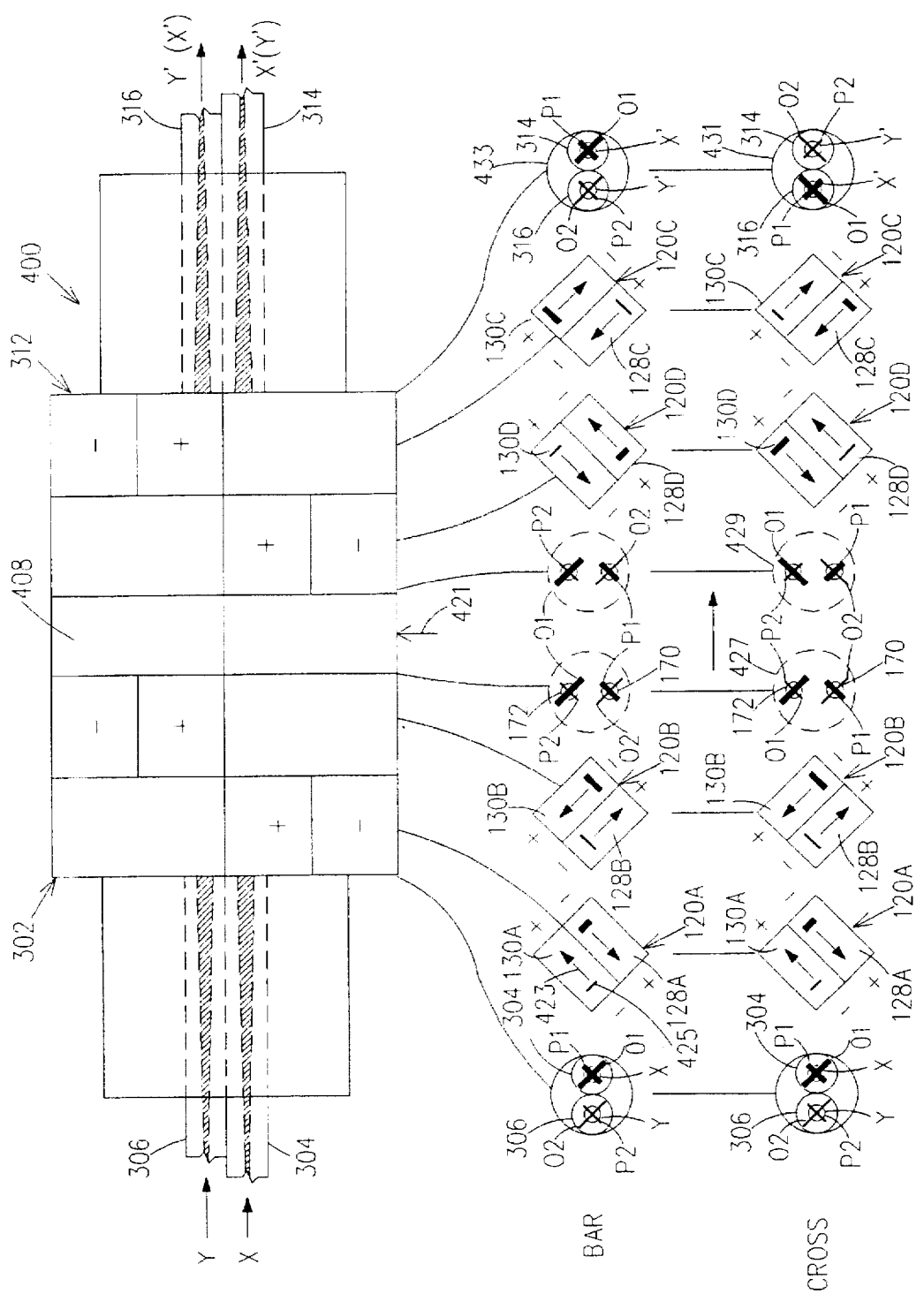
FIG. 4 is a schematic representation of an embodiment of a compact polarization-independent 2×n optical switch according to the invention, and also shows the polarization components of the light beams X and Y at various points in the compact polarization-independent 2×n optical switch in both the BAR and CROSS states.

FIG. 4 shows an embodiment of a first compact optical component, the compact polarization-independent 2×n optical switch 400 according to the invention, that can be made using either of the basic structures described above with reference to FIGS. 1A–1E and 3A–3D. The embodiment shown in FIG. 4 is based on the structure shown in FIG. 3A.

In the optical switch 400, the polarization-changing optical element located between the first and second I/O ports 302 and 312 is the 0°/90° polarization rotator 408. The 0°/90° polarization rotator can be a liquid crystal, electro-optic, magneto-optic, or other suitable type of polarization rotator. Such 0°/90° polarization rotators are known in the art and therefore will not be described here. The 0°/90° polarization rotator includes the control input 421. The state of a control signal fed into the control input controls the polarization rotation imposed by the 0°/90° polarization rotator on light passing through it. Hence, the state of the control signal determines whether the compact 2×2 optical switch 400 is in its BAR state or in its CROSS state. In the BAR state, the 0°/90° polarization rotator rotates the angles of polarization by 0°, and the optical switch 400 transmits the light beams X and Y received via the optical fibres 304 and 306 to the optical fibres 314 and 316, respectively, as the light beams X' and Y'. In the CROSS state, the 0°/90° polarization rotator rotates the angles of polarization by 0°, and the optical switch transmits the light beams X and Y to the optical fibres 316 and 314, respectively, as the light beams X' and Y'.

FIG. 4 also shows the polarization components O1, P2 and O2, P2 of the light beams X and Y at various points in their passage through the compact 2×2 optical switch 400 in both the BAR and the CROSS states. Finally, FIG. 4 shows the action of the opposed walk-off crystal pairs 120A through 120D constituting the first I/O port 302 and the second I/O port 312 in both the BAR and the CROSS states. The actual direction in which each of the walk-off crystals 128 and 130 constituting each of the opposed walk-off crystal pairs 120 deviates the polarization component passing through it is indicated by an arrow, such as the arrow 423. The polarization component that is deviated by each walk-off crystal in the direction of the arrow is indicated by a bar, such as the bar 425, at the base of the arrow. The thin bars represent the light beam X. The thick bars represent the light beam Y. The longer bars represent the orthogonal polarization components O1 and O2, the shorter bars represent the parallel polarization components P1 and P2. For example, the arrow 423 shows the direction in which the walk-off crystal 130A deviates the parallel polarization component P2 of the light beam Y, indicated by the short, thin, bar 427. The walk-off directions of the walk-off crystals for light passing from the first face to the second face are indicated in FIG. 4 by the "+" and "−" symbols adjacent the ends of each walk-off crystal. The same convention is used to indicate the different polarization components in FIG. 5, and a similar convention is used in FIGS. 6A and 6B.

In the BAR state of the 2×2 optical switch 400, the control signal received via the control input 421 sets the 0°/90° polarization rotator 408 to its 0° polarization rotation state. In this state, the 0°/90° polarization rotator rotates the angle of polarization of the polarization components passing through it by 0°. The action of the 2×2 optical switch on the light beams X and Y is the same as that of the optical component 100 described above with reference to FIGS. 2A–2G. The 2×2 optical switch is non-inverting with respect to the light beams X and Y, and transmits the light beams X and Y to the optical fibres 314 and 316, respectively, as the light beams X' and Y'.

In the CROSS state of the compact 2×2 optical switch 400, the control signal received via the control input 421 sets the 0°/90° polarization rotator 408 to its 90° polarization rotation state. In this state, the 0°/90° polarization rotator 408 rotates the angle of polarization of the polarization of the polarization components passing through it though 90°. The action of the optical switch 400 on the light beams X and Y is the same as that of the optical component 100 described above with reference to FIGS. 2A-2D and 2H-2J. In the CROSS state, the optical switch is inverting with respect to the light beams X and Y, and transmits the light beams X and Y to the optical fibres 316 and 314, respectively, as the light beams X' and Y'. Since the action of the optical switch on the light beams X and Y is the same as that of the optical component 100 described above with reference to FIGS. 2A-2J, the action of the optical switch will not be described further.

It can be seen by comparing the view 431 in FIG. 4, which shows the polarization components transmitted to the optical fibres 314 and 316 in the CROSS state, with the view 433, which shows the polarization components transmitted to the optical fibres 314 and 316 in the BAR state, that the one of the optical fibres 314 and 316 that respectively receives the light beam X received via the optical fibre 304 and the light beam Y received via the optical fibre 306 depends on the state of the control signal received via the control input 421, and the consequent polarization rotation state of the 0°/90° polarization rotator 408.

A 2×1 optical switch according to the invention can be based on 2×2 optical switch just described by omitting one of the optical fibres 304, 304, 314, or 316. Alternatively, one of the I/O ports 302 and 312 can be replaced with one of the simplified I/O ports 552 or 582 to be described below with reference to FIGS. 5B and 5C. If the I/O port 582 is used, a half-wave plate must be interposed between the polarization-rotating optical element 408 and the second I/O port 582.

Figure 5A:
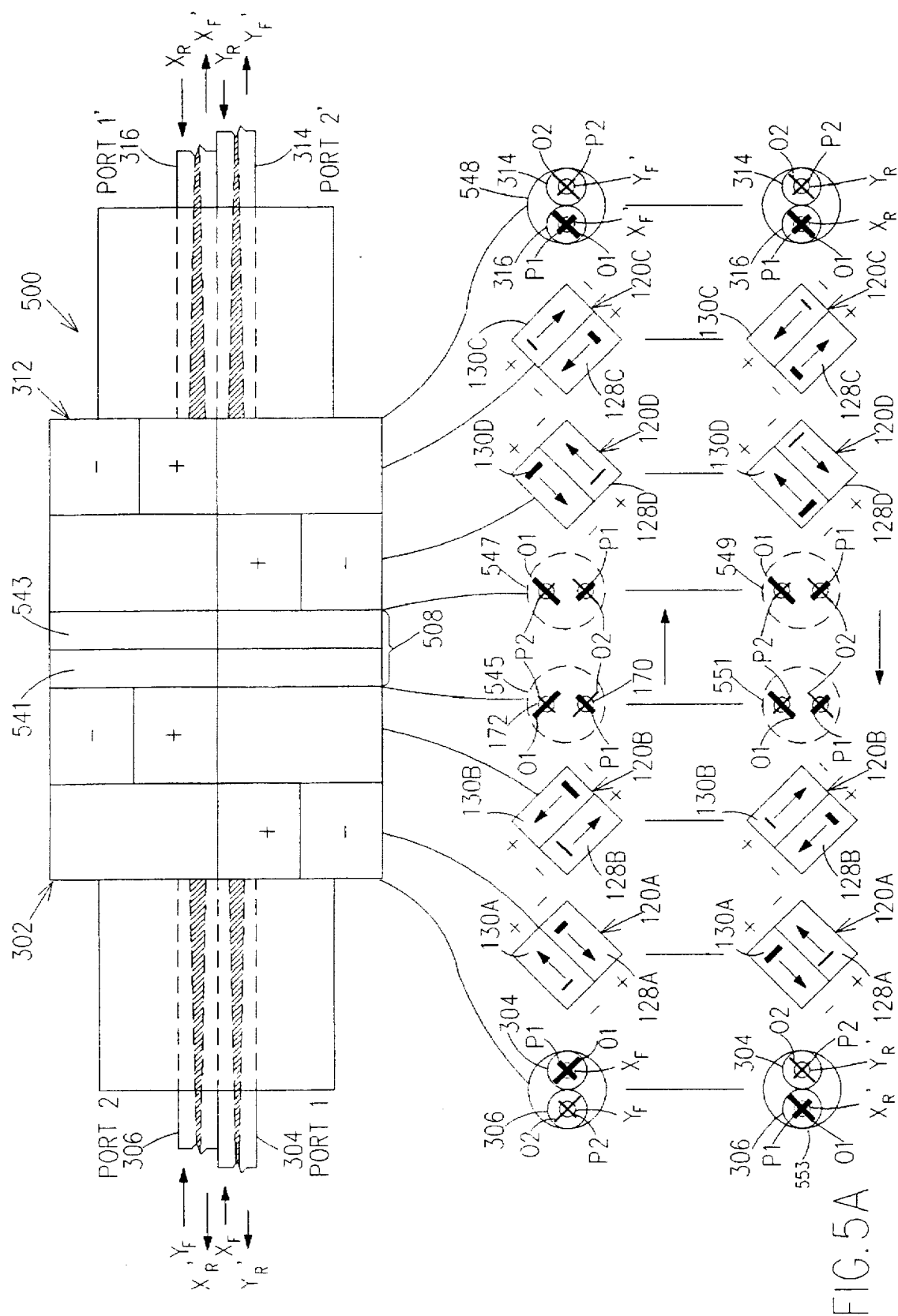
FIG. 5A is a schematic representation of an embodiment of a compact, polarization-independent, four-port optical circulator according to the invention and also shows the polarization components of the light beams X and Y at various points in the compact, polarization-independent, four-port optical circulator in both the forward and reverse directions of light transmission.

FIG. 5A shows an embodiment of a second optical component, the compact, polarization-independent 2×n four-port optical circulator 500, that can be made using either of the structures described above with reference to FIGS. 1A-1E and 3A-3D. The embodiment shown in FIG. 5A is based on the structure shown in FIGS. 3A-3D.

In the optical circulator 500, the polarization-changing optical element located between the first I/O port 302 and the second I/O port 312 includes the non-reciprocal polarization rotator 508. The non-reciprocal polarization rotator comprises a serial arrangement of the 45° Faraday rotator 541 and the half-wave plate 543. The non-reciprocal polarization rotator 508 rotates by 90° the angle of polarization of the polarization components passing only in the forward direction from the first I/O port 302 to the second I/O port 312, and rotates by 0° the angle of polarization of the polarization components passing in the reverse direction from the second I/O port to the first I/O port. In the forward direction, the Faraday rotator 541 and the half-wave plate 543 each rotate the angle of polarization of the polarization components by +45°, making a total rotation of 90°. The Faraday rotator is non-reciprocal, so that, in the reverse direction, the Faraday rotator rotates the angle of polarization of the polarization components by +45°, whereas the half-wave plate rotates the angle of polarization of the polarization components by −45°, making a total rotation of 0°.

As a result of the non-reciprocal 90° rotation on the angle of polarization of the polarization components imposed by the non-reciprocal polarization rotator, when the light beams $X_F$ and $Y_F$, received via the optical fibres 304 and 304, pass in the forward direction from the first I/O port 302 to the second I/O port 312, the optical circulator 500 is inverting with respect to these light beams. The optical circulator transmits the light beams $X_F$ and $Y_F$ to the optical fibres 316 and 314, respectively, as the light beams $X'_F$ and $Y'_F$, respectively. On the other hand, when the light beams $X_R$ and $Y_R$, received via the optical fibres 316 and 314 pass in the reverse direction from the second I/O port 312 to the first I/O port 302, the optical circulator is non-inverting with respect to the light beams $X_R$ and $Y_R$, and transmits them to the optical fibres 306 and 304, respectively, as the light beams $X'_R$ and $Y'_R$.

FIG. 5A also shows the polarization components of the light beams $Y_F$, $X_R$ and $Y_R$ at various points in their passage through the compact four-port optical circulator 500 in both the forward and the reverse directions, using the same indication convention as that described above with reference to FIG. 4.

When the light beams $X_F$ and $Y_F$ pass in the forward direction from the first I/O port to the second I/O port, the non-reciprocal polarization rotator 508 subjects the angle of polarization of the polarization components leaving the first I/O port 302 to a 90° rotation. This can be seen by comparing the view 547 with the view 545, which show the polarization components respectively leaving and entering the non-reciprocal polarization rotator. As a result of this 90° rotation, the action of the 2×2 optical circulator 500 on the light beams X and Y is the same as that of the optical component 100 described above with reference to FIGS. 2A-2D and 2H-2J. The 2×2 optical circulator is inverting with respect to the light beams $X_F$ and $Y_F$, and transmits the light beams $X_F$ and $Y_F$ to the optical fibres 316 and 314, respectively, as the light beams $X_F'$ and $Y_F'$, as shown in the view 548. Because, in the forward direction, the optical circulator 500 operates similarly to the optical component 100, described above with reference to FIGS. 2A-2D and 2H-2J, the operation of the optical circulator in the forward direction will not be described further here.

For light passing in the reverse direction from the second I/O port 312 to the first I/O port 302, the light beams $X_R$ and $Y_R$ are respectively received via the optical fibres 316 and 314. The non-reciprocal polarization rotator 508 subjects the angle of polarization of the polarization components leaving the second I/O port 312 to a 0° rotation. This can be seen by comparing the view 551 with the view 549, which show the polarization components respectively leaving and entering the non-reciprocal polarization rotator. As a result of this 0° rotation, the action of the 2×2 optical circulator 500 on the light beams $X_R$ and $Y_R$ is the same as that of the optical component 100 described above with reference to FIGS. 2A-2G. The 2×n optical circulator is non-inverting with respect to the light beams $X_R$ and $Y_R$, and transmits the light beams $X_R$ and $Y_R$ to the optical fibres 306 and 304, respectively, as the light beams $X_F'$ and $Y_F'$, as shown in the view 553. Because, in the reverse direction, the optical circulator 500 operates similarly to the optical component 100, described above with reference to FIGS. 2A-2G, the operation of the optical circulator in the reverse direction will not be described further here.

Thus, the compact four-port optical circulator structure shown in FIG. 5A constitutes a true four-port circulator. If the optical fibres 304, 316, 306 and 314 are respectively regarded as the ports 1, 1', 2, and 2', light entering port 1 is transmitted to port 1' and light entering via port 2 is transmitted to port 2' in the forward direction. In the reverse direction, light entering port 2' is transmitted to port 1 and light entering port 1' is transmitted to port 2. In other words, light is from port 1 to port 1', from port 1' to port 2, from port 2 to port 2' and from port 2' to port 1.

If the magnetic field (not shown) that determines the directionality of the Faraday rotator 541 is reversed, light is transmitted from the optical fibre 304 (port 1) to the optical fibre 314 (port 2') and from the optical fibre 306 (port 2) to the optical fibre 316 (port 1') in the forward direction. Light is transmitted from the optical fibre 316 (port 1') to the optical fibre 304 (port 1) and from the optical fibre 314 (port 2') to the optical fibre 306 (port 2) in the reverse direction.

The four-port optical circulator 500 just described can be converted into a three port optical circulator by omitting any one of the four optical fibres 304, 306, 314 and 316, or by not connecting the distal end of any one of the optical fibres to another optical element. For example, if the distal end of the optical fibre 314 is not connected, the resulting 3-port optical circulator transmits the light beam $X_F$ in the forward direction from the optical fibre 304 to the optical fibre 316 as the light beam $X_F'$. Light received via the optical fibre 306 is not transmitted anywhere where it can be received, however, because the distal end of the optical fibre 314 is disconnected. In the reverse direction, the 3-port circulator transmits the light beam $X_R$, received via the optical fibre 316, to the optical fibre 306 as the light beam $X_R'$. No light is received via the optical fibre 314.

Figure 5B:
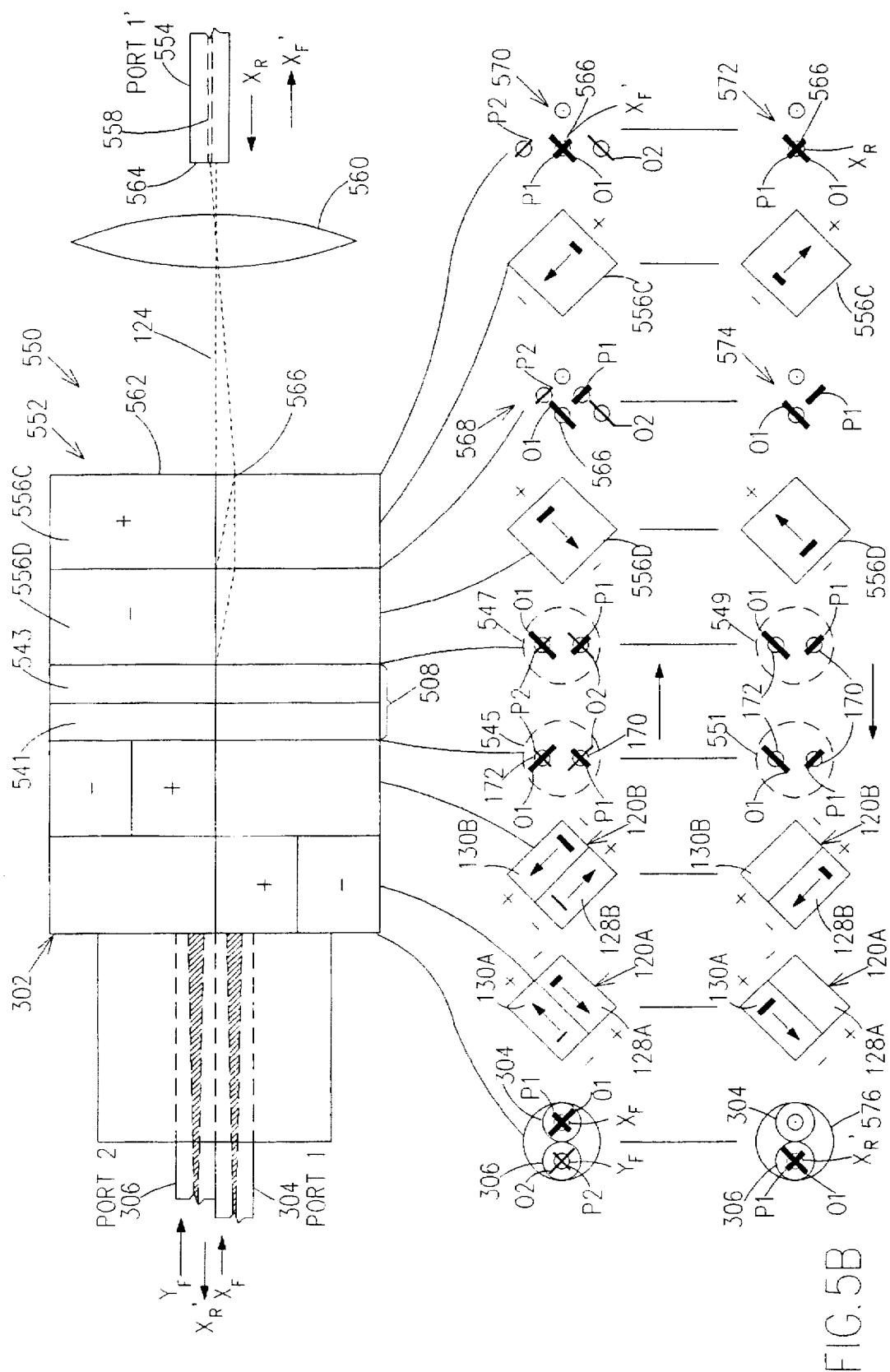
FIG. 5B is a schematic representation of a first embodiment of a compact, polarization-independent, three-port optical circulator according to the invention. The first embodiment of the three-port circulator includes a first alternative embodiment of the second I/O port according to the invention.

FIG. 5B shows a first embodiment 550 of an alternative 3-port optical circulator according to the invention. The structure of the 3-port optical circulator is the same as that of the four-port optical circulator 500 shown in FIG. 5A, except that the 3-port optical circulator 550 includes the simplified second I/O port 552 in lieu of the second I/O port 312. The simplified I/O port 552 includes the single walk-off crystals 556D and 556C, the lens 560 and the single-mode optical fibre 554.

The walk-off crystals 556D and 556C have the same walk-off amount as the walk-off crystals 128A, 128B, 130A and 130B of the first I/O port 302, and are preferably of the same material and have the same thickness as the walk-off crystals of the first I/O port. The walk-off directions of the walk-off crystals 556D and 556C are parallel to the walk-off directions of the walk-off crystals 130A and 128B, respectively, of the first I/O port. This makes the walk-off directions of the walk-off crystals 556D and 556C orthogonal to one another.

Since, in contrast to the opposed walk-off crystal pairs 120D and 120C of the second I/O port 312 of the embodiment described above with respect to FIG. 5A, the walk-off crystals 556C and 556D do not require precise lateral alignment relative to the optical axis 124, the cost of making the 3-port circulator 550 can be reduced by making a component block from large pieces of the materials of the Faraday rotator 541, the half-wave plate 543 and the walk-off crystals 556D and 556C. The component block is then divided into multiple sub-assemblies about 1 mm square by dividing operations on two orthogonal axes, as described in U.S. patent application Ser. No. 08/588,042, the disclosure of which is incorporated in this disclosure by reference. Each resulting sub-assembly is then aligned relative to its respective first I/O port 302 to set the walk-off directions of the walk-off crystals 556C and 556D parallel to the walk-off directions of the first I/O port, and is then attached to the first I/O port.

The light from the optical fibre 304 passes to the optical fibre 554 via the location 566, which is where the optical axis 360 (FIGS. 3A–3D) of the optical fibre 304 intersects the first face 562 of the walk-off crystal 556C. To couple all of the light emitted by the expanded core of the optical fibre 304 into the conventional-diameter core 558 of the optical fibre 554 and vice versa, the diameter of the light beam must be changed by a factor equal to the ratio of the diameters of the cores. The lens 560 forms a reduced-size image of end of the core of the optical fibre 304 on the end 564 of the core of the single-mode optical fibre 554 and forms an enlarged image of end of the core 558 of the single-mode optical fibre on the end of the core of the optical fibre 306. The focal length of the lens 560 and the position of the lens on the optical axis between the first face 562 of the walk-off crystal 556C and the end 564 of the optical fibre 554 are set to provide the required change in beam diameter. In the practical embodiment described above, the lens 560 changed the beam diameter by a factor of four.

Although the conventional bi-convex lens shown in FIG. 5B can be used as the lens 560, a cylindrical gradient index (GRIN) lens is preferably used, since this type of lens is easier to mount. Other suitable types of lenses can alternatively be used.

The optical fibre 554 is mounted parallel to the optical axis 124 with its optical axis laterally offset from the optical axis by about one-half of the spacing between the cores of the optical fibres 304 and 306, divided by the beam diameter change provided by the lens 560. In this position, the core 558 of the optical fibre will receive the light from the optical fibre 304 and will transmit light to the optical fibre 306.

A TEC optical fibre may alternatively be used as the optical fibre 554. In this case, the lens 560 is arranged to provide a same-size image of the core of the optical fibre 304 on the core of the optical fibre 554.

If the light beams $X_F$, $Y_F$ and $X_R$ are collimated light beams, as shown in FIGS. 1A–1D, the lens 560 may be omitted from the second I/O port 552. Additionally or alternatively, the single-mode optical fibre 554 may be omitted.

The operation of the 3-port optical circulator 550 on the light beams X and Y will now be described. In the forward direction, the light beam $X_F$ is received via the optical fibre 304. Light, if any, received via the optical fibre 306 constitutes the light beam $Y_F$. The light beams $X_F$ and $Y_F$ pass through the first I/O port 302, which deviates the polarization components of the light beams as described above with reference to FIGS. 2A–2D. The view 545 shows the polarization components O1, P1, O2 and P2 of the light beams $X_F$ and $Y_F$ at the displaced locations 170 and 172 as they enter the non-reciprocal polarization-rotating element 508.

The non-reciprocal polarization-rotating element 508 rotates the angle of polarization of the polarization components of the light beams $X_F$ and $Y_F$ by 90°. The view 547 shows the polarization components of the light beams $X_F$ and $Y_F$ as they enter the second I/O port 552.

In the second I/O port 552, the parallel polarization components P1 and P2 are orthogonal to the walk-off direction of the walk-off crystal 556D and therefore pass through this crystal without deviation. However, the orthogonal polarization components O1 and O2 are parallel to the walk-off direction of the walk-off crystal 556D. The walk-off crystal deviates the orthogonal polarization components in the direction opposite to its walk-off direction. This aligns the orthogonal polarization component O1 with the location 566 on the first face 562 of the walk-off crystal 556C, as shown in the view 568.

In the walk-off crystal 556C, the orthogonal polarization components O1 and O2 are orthogonal to the walk-off direction of the walk-off crystal 556C, and therefore pass through this walk-off crystal without deviation. However, the parallel polarization components P1 and P2 are parallel to the walk-off direction of the walk-off crystal 556C. The walk-off crystal 556C deviates the parallel polarization components in the direction opposite to its walk-off direction.

The view 570 shows the polarization components of the light beams $X_F$ and $Y_F$ at the first face 562 of the walk-off crystal 556C of the second I/O port 552. Here, the orthogonal polarization component O1 and the parallel polarization component P1 of the light beam $X_F$ are overlaid at the position 566, whence they pass through the lens 560. The lens focuses the polarization components O1 and P1 on the core 558 of the single-mode optical fibre 554. The polarization components O1 and P1 of the light beam $X_F$ enter the optical fibre 554 as the light beam $X_F'$.

The orthogonal polarization component O2 and the parallel polarization component P2 of the light beam $Y_F$ are located at positions offset from the position 566 as shown. Each of the offset positions is offset from the position 566 by a distance about equal to the spacing between the light beams $X_F$ and $Y_F$. The lens 560 focuses the light from the offset positions well outside the core of the optical fibre 554. Hence, none of the light entering the 3-port circulator 550 via the optical fibre 306 as the light beam $Y_F$ enters the optical fibre 554.

In the reverse direction, the light beam $X_R$ is received via the optical fibre 554. The diameter of the light beam is expanded by the lens 560. The light beam passes into the walk-off crystal 556C at the location 566, as shown in the view 572. In the walk-off crystal 556C, the orthogonal polarization component O1 of the light beam $X_R$ is orthogonal to the walk-off direction of the walk-off crystal 556C, and so passes through this crystal without deviation. However, the parallel polarization component P1 is parallel to the walk-off direction of the walk-off crystal 556C. The walk-off crystal 556C deviates the parallel polarization component in its walk-off direction, as shown in the view 574.

The polarization components of the light beam $X_R$ enter the walk-off crystal 556D where the parallel polarization component P1 is orthogonal to the walk-off direction of the walk-off crystal, and therefore passes through the walk-off crystal without further deviation. However, the orthogonal polarization component O1 is parallel to the walk-off direction of the walk-off crystal 556D. The walk-off crystal 556D deviates the orthogonal polarization component in its walk-off direction.

The view 549 shows the polarization components of the light beam $X_R$ as they enter the non-reciprocal polarization rotator 508. The parallel polarization component P1 is located at the displaced location 170, and the orthogonal polarization component O1 is located at the displaced location 172.

The non-reciprocal polarization rotator 508 leaves the angles of polarization of the polarization components O1 and P1 passing through it in the reverse direction unchanged. The view 551 shows the polarization components after they have passed through the non-reciprocal polarization rotator. Here, the angles of polarization of the polarization components are identical to those shown in the view 549.

The angles of polarization of the polarization components O1 and P1 of the light beam $X_R$ entering the first I/O port 302 at the displaced locations 170 and 172 in the reverse direction are orthogonal to those of the polarization components of the light beam $X_F$ leaving the first I/O port in the forward direction (compare the view 551 with the view 545). The first I/O port is therefore inverting with respect to the light beam $X_R$ and overlays the polarization components O1 and P1 at the position of the optical fibre 306, though which the light beam $Y_F$ entered the optical circulator 550, as shown in the view 576. The polarization components enter the optical fibre 306 as the light beam $X_R'$.

Figure 5C:
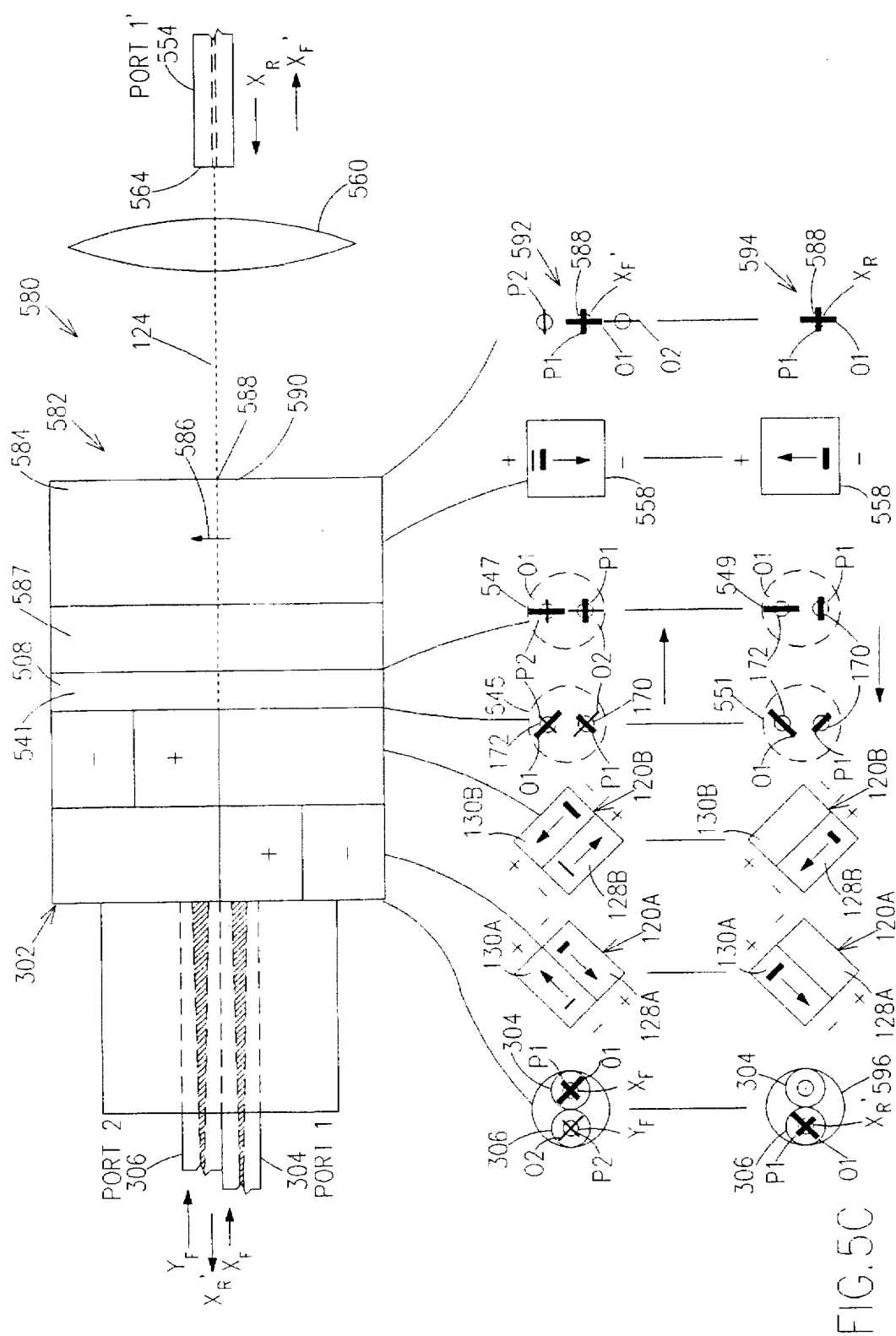
FIG. 5C is a schematic representation of a second embodiment of a compact, polarization-independent, three-port optical circulator according to the invention. The second embodiment of the three-port circulator includes a second alternative embodiment of the second I/O port according to the invention.

FIG. 5C shows a second embodiment 580 of the alternative 3-port optical circulator according to the invention. The structure of the 3-port optical circulator 580 is similar to that of the three-port optical circulator 550 described above with reference to FIG. 5B. Elements that are the same as in the embodiment shown in FIG. 5B are indicated using the same reference numerals and will not be described again here. In the 3-port optical circulator 580, the 45° Faraday rotator 541 serves as the non-reciprocal polarization rotator 508, and the second I/O port 582 includes the thick walk-off crystal 584 in lieu of the walk-off crystals 556D and 556C. The second I/O port 582 optionally includes the birefringent crystal 587.

The thick walk-off crystal 584 has a walk-off amount of $\sqrt{2}\times$ the walk-off amount of the walk-off crystals 128A, 128B, 130A and 130B of the first I/O port 302, and is preferably of the same material as the walk-off crystals of the first I/O port and has a thickness of $\sqrt{2}\times$ the thickness of the walk-off crystals of the first I/O port. The walk-off direction of the thick walk-off crystal 584 is oriented at 45° to the walk-off directions of the walk-off crystals of the first I/O port.

Since only one of the polarization components of each light beam is deviated by the thick walk-off crystal 584, the thick walk-off crystal causes an optical path length difference between the polarization components of the light beam. If the modulation rate of the light beam is high enough for this optical path length difference between its polarization components to degrade performance, the birefringent crystal 586 can be included in the second I/O port 582. The birefringent crystal is located between the non-reciprocal polarization rotator 508 and the thick walk-off crystal 584, and is orientated with its higher refractive index direction aligned parallel to the direction of the undeviated polarization components. If the thick birefringent crystal has a thickness of a and a refractive index difference of $\Delta n_1$, and the birefringent crystal has a refractive index difference of $\Delta n_2$, then the thickness of the birefringent crystal is $\alpha \Delta n_1 / \Delta n_2$.

As with the first embodiment of the 3-port circulator described above, the cost of making the second embodiment of the 3-port circulator can be reduced by making a component block from large pieces of the materials of the Faraday rotator 541, the optional birefringent crystal 587 and the thick walk-off crystal 584. The component block is then divided into multiple sub-assemblies about 1 mm square by dividing operations on two orthogonal axes, as described in the above-mentioned U.S. patent application Ser. No. 08/588,042. Each resulting sub-assembly is then aligned to set the walk-off direction of the thick walk-off crystal 584 at 45° to the walk-off directions of its respective first I/O port, and is then attached to the first I/O port.

The axis of the optical fibre 554 is offset from the optical axis by about one-half of the spacing between the cores of the optical fibres 304 and 306 divided by the diameter change provided by the lens 560 to enable the core of the optical fibre to receive the light from the optical fibre 304 and to transmit light to the optical fibre 306. This offset is in the direction perpendicular to the plane defined by the optical fibres 304 and 306.

If the light beams entering the optical circulator 550 are collimated light beams, as in FIGS. 1A–1D, the lens 560 may be omitted from the second I/O port 582. Additionally or alternatively, the single-mode optical fibre 554 may be omitted.

The operation of the 3-port optical circulator 580 on the light beams X and Y will now be described. In the forward direction, the light beam $X_F$ is received via the optical fibre 304. Light, if any, received via the optical fibre 306 constitutes the light beam $Y_F$. The light beams $X_F$ and $Y_F$ pass through the first I/O port 302, and the polarization components of the light beams are deviated by the first I/O port as described above with reference to FIGS. 2A–2D. The Faraday rotator 541 rotates the angle of polarization of the polarization components of the light beams $X_F$ and $Y_F$ by 45°. This orients the polarization components either parallel or orthogonal to the walk-off direction of the thick walk-off crystal 584. The polarization components of the light beams $X_F$ and $Y_F$ as they enter the second I/O port 582 are shown in the view 547.

In the second I/O port 582, the parallel polarization components P1 and P2 are orthogonal to the walk-off direction 586 of the thick walk-off crystal 584 and therefore pass through this crystal without deviation. However, the orthogonal polarization components O1 and O2 are parallel to the walk-off direction of the thick walk-off crystal 584. The thick walk-off crystal deviates the orthogonal polarization components in the direction opposite to its walk-off direction. The walk-off direction and walk-off amount of the thick walk-off crystal are such that the orthogonal polarization component O1 is overlaid with the undeviated parallel polarization component P1 at the location 588 on the first face 590 of the thick walk-off crystal 584, as shown in the view 592. The location 588 is displaced from the optical axis 124 in the same direction as, and by an amount equal to, the displacement of the displaced location 170 from the optical axis.

The view 592 shows the polarization components of the light beams $X_F$ and $Y_F$ at the first face 590 of the thick walk-off crystal 584 of the second I/O port 582. Here, the orthogonal polarization component O1 and the parallel polarization component P1 of the light beam $X_F$ are overlaid at the location 588, whence they pass through the lens 560, which focuses them on the end 564 of the optical fibre 554. The polarization components of the light beam $X_F$ enter the optical fibre 554 as the light beam $X_{F'}$. The orthogonal polarization component O2 and the parallel polarization component P2 of the light beam $Y_F$ are located at positions offset from the location 588 as shown. The lens 560 focuses light from these offset positions well outside the core of the optical fibre 554. Hence, none of the light entering the 3-port circulator 580 via the optical fibre 306 as the light beam $Y_F$ enters the optical fibre 554.

In the reverse direction, the light beam $X_R$ is received via the optical fibre 554. The diameter of the light beam is expanded by the lens 560. The light beam passes into the thick walk-off crystal 584 at the location 588, as shown in the view 594. In the thick walk-off crystal 584, the parallel polarization component P1 of the light beam $X_R$ is orthogonal to the walk-off direction 586 of the walk-off crystal 584, and so passes through this crystal without deviation. However, the orthogonal polarization component O1 is parallel to the walk-off direction of the thick walk-off crystal 582. The thick walk-off crystal 582 deviates the orthogonal polarization component in its walk-off direction. The walk-off direction and walk-off amount of the thick walk-off crystal are such that the orthogonal polarization component O1 is deviated to the displaced location 172.

The view 549 shows the polarization components of the light beam $X_R$ as they enter the non-reciprocal polarization rotator 508. The parallel polarization component P1 is located at the displaced location 170, and the orthogonal polarization component O1 is located at the displaced location 172.

The non-reciprocal polarization rotator 508 rotates the angles of polarization of the polarization components O1 and P1 passing through it in the reverse direction by 45°. The view 551 shows the polarization components after they have passed through the non-reciprocal polarization rotator. Here, the angle of polarization of each of the polarization components is aligned parallel to the walk-off directions of one of the opposed walk-off crystal pairs of the first I/O port 302.

The angles of polarization of the polarization components O1 and P1 of the light beam $X_R$ entering the first I/O port 302 at the displaced locations 170 and 172 in the reverse direction are orthogonal to those of the polarization components of the light beam $X_F$ leaving the first I/O port in the forward direction (compare the view 551 with the view 545). The first I/O port is therefore inverting with respect to the light beam $X_R$ and overlays the polarization components O1 and P1 at the position of the optical fibre 306, though which the light beam $Y_F$ entered the optical circulator 550, as shown in the view 596. The polarization components enter the optical fibre 306 as the light beam $X_{R'}$.

Figure 6A:
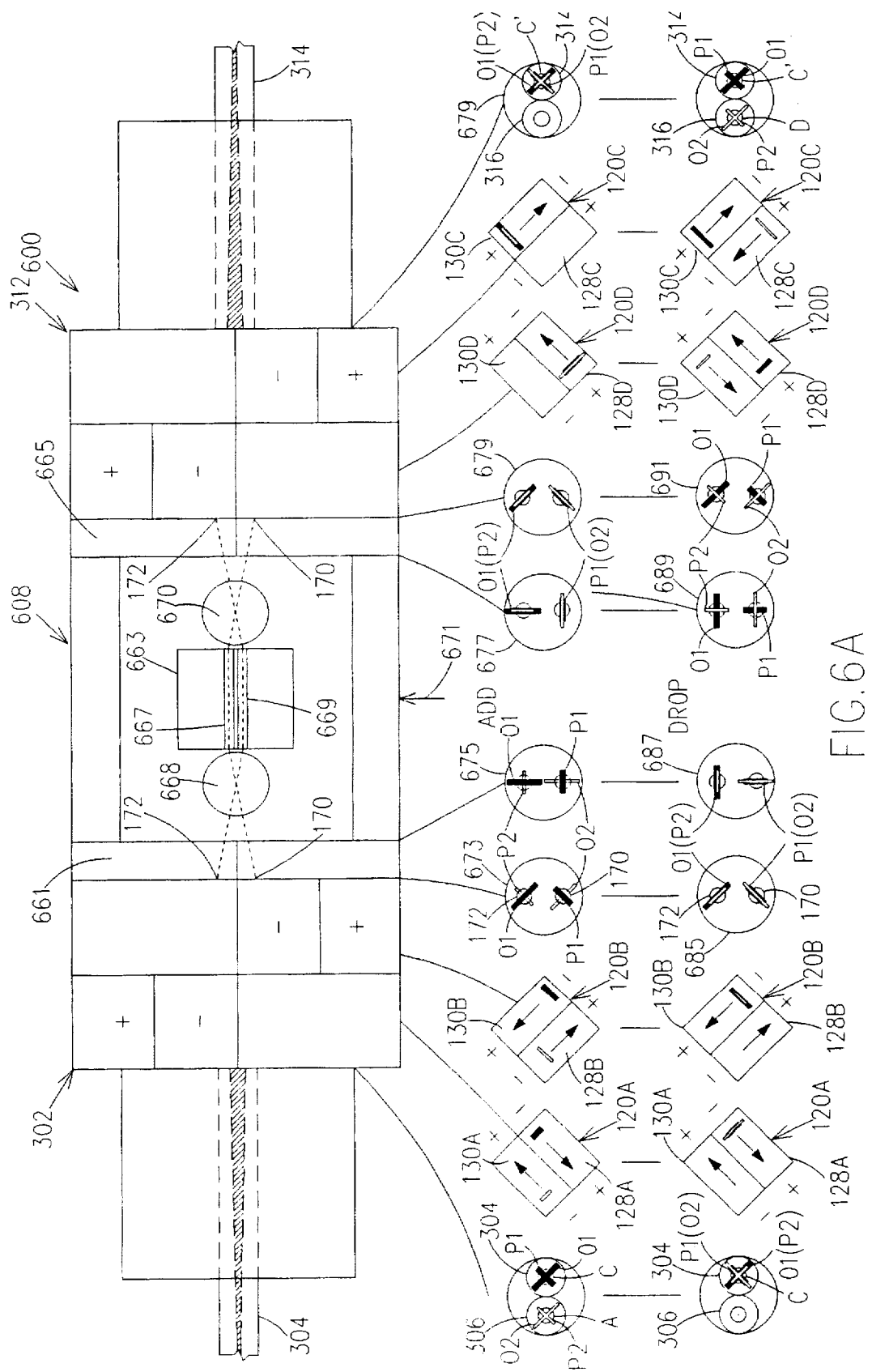
FIG. 6A is a schematic representation of an embodiment of a compact, polarization-independent 2×2 add-drop filter according to the invention and also shows the polarization components of the light beams X and Y at various points in the compact, polarization-independent 2×2 four-port add-drop filter in its ADD and DROP modes.
Figure 6B:
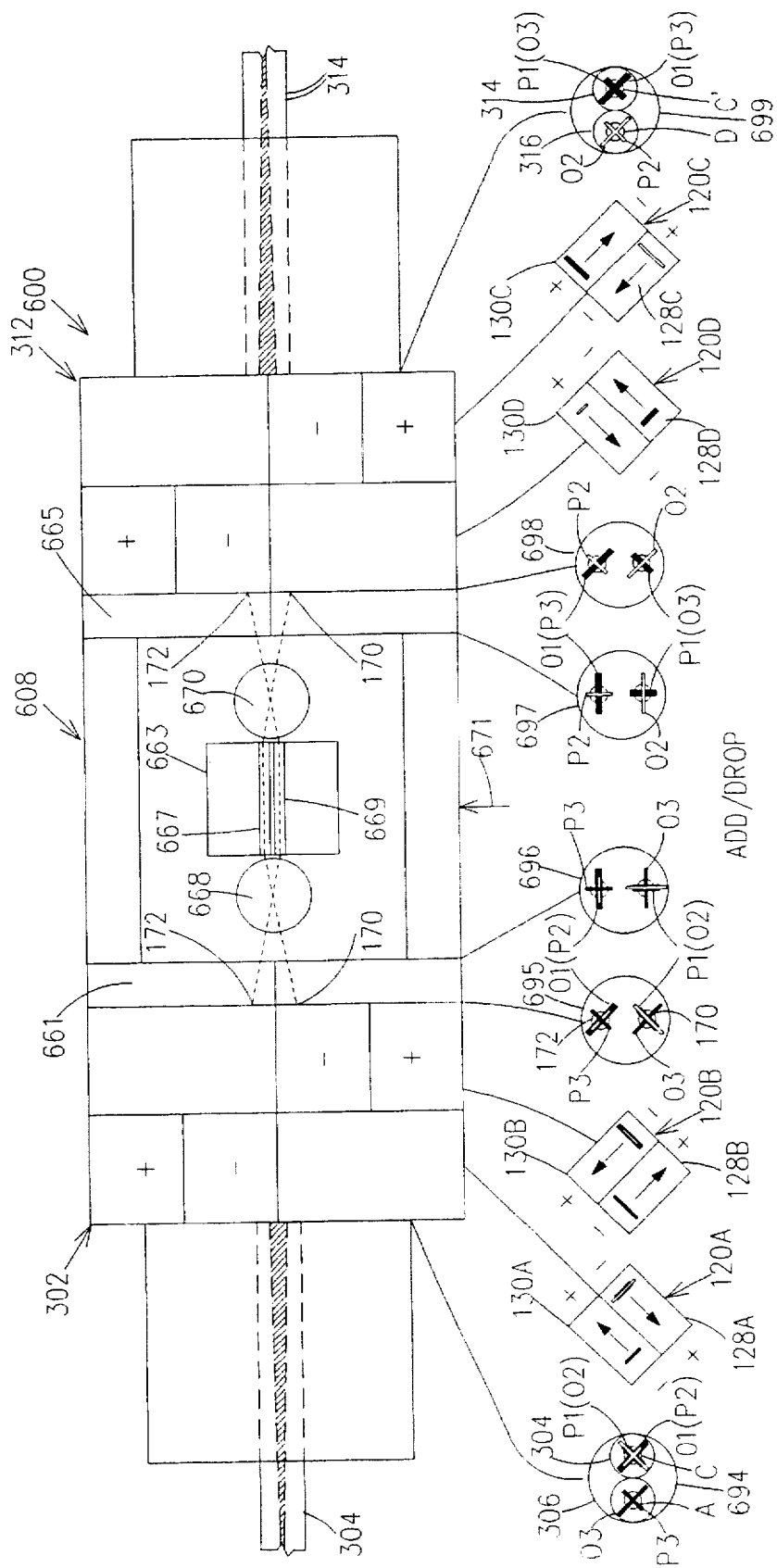
FIG. 6B shows again the schematic representation of the embodiment of the compact, polarization-independent 2×2 add-drop filter according to the invention and also shows the polarization components of the light beams X and Y at various points in the compact, polarization-independent 2×2 four-port add-drop filter in its ADD/DROP mode.

FIGS. 6A and 6B show a third type of compact optical component, the compact, polarization-independent, 2×2 add/drop AOTF tunable filter 600, that can be made using either of the structures described above with reference to FIGS. 1A–1E and 3A–3D. The embodiment shown in FIGS. 6A and 6B are based on the structure shown in FIG. 3A.

An add-drop filter is used in optical communication networks in which multiple beams of light, each modulated by a different information signal, are transmitted via a common optical fibre. The light in each of the multiple light beams is of a different wavelength. The multiple beams of light will be referred to as a composite light beam. If the wavelengths of the m light beams constituting the composite light beam transmitted via the optical fibre are λ1 through λm, the add-drop filter 600 in its ADD mode adds a modulated light beam of a different wavelength λα to the optical fibre for transmission, so that the optical fibre now transmits m +1 light beams. In its DROP mode, the add-drop filter extracts the modulated light beam at one of the wavelengths λd ($1 \leq d \leq m$) from the composite light beam transmitted via the optical fibre, so that the optical fibre now transmits m −1 light beams. This enables, for example, the information signal carded by the light beam of wavelength λd to be demodulated.

In its ADD/DROP mode, the add-drop filter 600 extracts the light beam at one of the wavelengths λd($1 \leq d \leq m$) from the composite light beam C transmitted via the optical fibre. In the same transaction with the optical fibre, the add-drop filter adds a modulated light beam A of wavelength λα to the composite light beam for transmission via the optical fibre in place of the extracted light beam, so that the optical fibre continues to transmit m light beams. The wavelength λα of the light beam A added to the composite light beam must be different from the wavelengths of the light beams that remain in the composite light beam after the light beam D with the wavelength λd has been extracted, but may be equal to λd.

In the add-drop tunable filter 600, the polarization-changing optical element located between the first I/O port 302 and the second I/O port 312 is the polarization-normalized acousto-optical tuned filter 608. The polarization-normalized acousto-optical tuned filter includes a serial arrangement the half-wave plate 661, the two-channel acousto-optical tuned filter (2-channel AOTF) 663 and the half-wave plate 665.

The 2-channel AOTF 663 includes the parallel optical waveguides 667 and 669 running along its length, parallel to the optical axis. The 2-channel AOTF is structured such that the optical waveguide 667 is aligned to receive the light emitted from the first I/O port 302 at the displaced location 170, and the optical waveguide 669 is aligned to receive the light emitted from the first I/O port 302 at the displaced location 172. The 2-channel AOTF 663 is oriented relative to the first and second I/O ports 302 and 312 so that the optical waveguides 667 and 669 lie in a plane passing through the optical axis 124 (FIG. 3C) and perpendicular to the plane defined by the optical axes of the optical fibres 304, 306, 314 and 316.

With the above-described orientation between the 2-channel AOTF 663 and the I/O ports 302 and 312, the polarization components are emitted from the displaced locations 170 and 172 of the first I/O port 302 towards the optical waveguides 667 and 669, and the polarization components are emitted from the optical waveguides 667 and 669 towards the displaced locations 170 and 172 of the second I/O port 312. However, the optical waveguides are typically about 10 µm wide, and are spaced about 40 µm apart. The displaced locations 170 and 172 are about 125 µm apart in the preferred embodiment of the I/O port 302.

To couple the light emitted from the first I/O port 302 to the waveguides 667 and 669, the polarization-normalized acousto-optical tuned filter also includes the imaging lens 668 disposed between the end of the 2-channel AOTF and the first I/O port 302. The imaging lens 668 forms a 3:1 reduced-size image of the displaced locations 170 and 172 on the ends of the optical waveguides. To couple the light emitted from the waveguides 667 and 669 to the second I/O port 312, the polarization-normalized acousto-optical tuned filter also includes the imaging lens 670 disposed between the other end of the 2-channel AOTF and the second I/O port 312. The imaging lens 670 forms a 3:1 magnified image of the ends of the optical waveguides on the displaced locations 170 and 172 of the second I/O port.

With the above described alignment between the 2-channel AOTF 663 and the I/O ports 302 and 312, the polarization components emitted from the first I/O port 302 are aligned at 45° relative to the waveguide plane of the 2-channel AOTF 663. The half-wave plate 661 rotates the angles of polarization of the polarization components emitted from the first I/O port. The half-wave plate rotates the angles of polarization by 45°, which aligns the angles of polarization either parallel or orthogonal to the waveguide plane of the 2-channel AOTF 663.

The 2-channel AOTF 663 includes the RF input 671 connected to electro-acoustic transducers (not shown) coupled to the optical waveguides 667 and 669. In each of the optical waveguides of the 2-channel AOTF, RF energy received via the RF input subjects the polarization components of the light passing through the optical waveguide to an RF electrical field. The RF electrical field selectively changes the angle of polarization of the polarization components passing through the optical waveguide. The change in the angle of polarization depends on the relationship between the frequency of the RF electrical field, the wavelength of the light, and the length of the optical waveguide. With a suitable choice of the frequency of the RF electrical field, optical waveguides in the 2-channel AOTF can rotate the angle of polarization of the polarization components of the light passing through them by exactly 90°. A suitable AOTF is described in U.S. patent application Ser. No. 08/594,074, the disclosure of which is incorporated in this application by reference.

When one polarization component of the composite light beam C passes through each of the optical waveguides of the 2-channel AOTF 663, the frequency of the RF energy can be selected to rotate through 90° the angle of polarization of the polarization components of just one of the light beams constituting the composite light beam. The angles of polarization of the polarization components of the other light beams constituting the composite beam remain substantially unchanged. By appropriately selecting the frequency of the RF energy, the light beam of a particular wavelength can be selected from among the light beams constituting the composite light beam to have the angle of polarization of its polarization components rotated through 90°. This rotation results in this light beam being treated differently from the other light beams when the composite light beam passes through the second I/O port.

The angles of polarization of the polarization components of the light leaving the 2-channel AOTF 663 are aligned at 45° relative to the walk-off directions of the opposed walk-off crystal pairs 120D and 120C constituting the second I/O port 312. The half-wave plate 665 rotates the angle of polarization of the polarization components leaving the 2-channel AOTF by 45°. This aligns each of the polarization components parallel to the walk-off direction of one of the opposed walk-off crystal pairs of the second I/O port 312.

An ADD-only tunable filter can be based on the tunable add-drop filter 600 just described by omitting the optical fibre 316. Alternatively, one of the simplified second I/O ports 552 or 582 described above with reference to FIGS. 5B and 5C can be substituted for the I/O port 312. If the I/O port 582 is used, the half-wave plate 665 is omitted from the polarization-normalized acousto-optical tuned filter 608.

A DROP-only tunable filter can be based on the tunable add-drop filter just described by omitting the optical fibre 306. Alternatively, one of the simplified second I/O ports 552 or 582 described above with reference to FIGS. 5B and 5C can be substituted for the I/O port 302. If the I/O port 582 is used, the half-wave plate 661 is omitted from the polarization-normalized acousto-optical tuned filter 608.

FIGS. 6A and 6B also show the polarization components of the composite light beam C and the light beams A and D added to and extracted from the composite light beam at various points in the compact add/drop filter 600 in the ADD, DROP and ADD/DROP modes. In the following description, the composite light beam is shown entering the compact add-drop filter 600 via the optical fibre 304 as the light beam C and leaving the compact add-drop filter via the optical fibre 314 as the light beam C'. In the ADD mode, the light beam of wavelength λα to be added to the composite light beam is connected to the compact add-drop filter via the optical fibre 306 as the light beam A. In the DROP mode, the light beam of wavelength λd extracted from the composite light beam is fed out from the compact add-drop filter via the optical fibre 316 as the light beam D. In the ADD/DROP mode, the light beam of wavelength λα to be added to the composite light beam is connected to the compact add-drop filter via the optical fibre 306 as the light beam A, and the light beam of wavelength λd extracted from the composite light beam is fed out from the compact add-drop filter via the optical fibre 316 as the light beam D.

In the depictions of the ADD and DROP modes in FIG. 6A, the thin, open bars represent the light beam A added to, and the light beam D extracted from, the composite light beam C. The thick, solid bars represent the composite light beam C. In the depictions of the ADD/DROP mode in FIG. 6B, the thin, open bars represent the light beam A added to, the thin solid bars represent the light beam D extracted from, the composite light beam C, and the thick, solid bars represent the composite light beam C. In all cases, the longer bars represent the orthogonal polarization components, the shorter bars represent the parallel polarization components.

In the ADD mode shown in FIG. 6A, the polarization components P1 and O1 of the composite light beam C, and the polarization components P2 and O2 of the light beam A to be added to the composite light beam pass through the first I/O port 302 the same way as the polarization components of the light beams X and Y pass through the first I/O port 102 in the description of FIGS. 2A–2D. Therefore, the action of the first I/O port on these polarization components will not be described in detail again.

The view 673 shows the polarization components as they enter the first half-wave plate 661. The parallel polarization component P1 of the light beam C and the orthogonal polarization component O2 of the light beam A are overlaid at the displaced location 170, and the parallel polarization component P2 of the light beam A and the orthogonal polarization component O1 of the light beam C are overlaid at the displaced location 172.

The half-wave plate 661 rotates the angle of polarization of each of the polarization components O1, O2, P1 and P2 by 45°, as shown in the view 675. After rotation by the half-wave plate 661, the orthogonal polarization components O1 and O2 enter the optical waveguides 669 and 667, respectively, with their angle of polarization parallel to the plane of the waveguides, and the parallel polarization components P1 and P2 enter the optical waveguides 667 and 669, respectively, with their angle of polarization orthogonal to the plane of the waveguides.

The frequency of the RF signal fed to the 2-channel AOTF 663 via the RF input 671 is chosen such that the 2-channel AOTF rotates the angle of polarization of light of wavelength $\lambda a$ by exactly 90°. The passage of the polarization components O2 and P2 of the light beam A through the optical waveguides 667 and 669, respectively, rotates the angles of polarization of these polarization components by 90°. The angles of polarization of the polarization components O1 and P1 of the composite light beam C remain unchanged by their passage through the waveguides 669 and 667, respectively. It can be seen from the view 677 that the angle of polarization of the polarization component P2 is now the same as that of the polarization component O1, whereas before these polarization components were orthogonal. Also, the angle of polarization of the polarization component O2 is now the same as that of the polarization component P1, whereas these polarization components were orthogonal.

The alignment of the angles of polarization of the polarization components O2 and P2 of the light beam A with the polarization components P1 and O1, respectively, of the light beam C makes the light beam A indistinguishable from the light beam C when the polarization components of the light beams pass through the second I/O port 312. The second I/O port therefore directs the polarization components of the light beam A to the same optical fibre as the polarization components of the light beam C.

After the polarization components O2 and P2 and the polarization components P1 and O1 have passed through the half-wave plate 665, shown in the view 679, the locations and orientations of the polarization components O1 and P2 correspond to those of the polarization component O1 in FIG. 2E, and the locations and orientations of the polarization components O2 and P1 correspond to those of the polarization component P1 in FIG. 2E. As described above with respect to FIGS. 2E–2G, the second I/O port 312 overlays the polarization components O1 and P1 of the composite light beam C with the polarization components O2 and P2 of the added light beam A at the location of the optical fibre 314, as shown in the view 681. The composite light beam C enters the optical fibre 314 with the added light beam A now forming a part of it. No light enters the optical fibre 316.

In the DROP mode, the composite light beam C enters the add-drop tunable filter 600 via the optical fibre 304. The view 683 shows the polarization components O1 and P1 of the composite light beam as respectively including the polarization components P2 and O2 of the light beam D. These polarization components are respectively indicated by the long and short narrow, open bars.

The action of the first I/O port on the composite light beam C is the same as that of the first I/O port on the polarization components O1 (including P2) and P1 (including O2) described above with reference to FIGS. 2B–2D, and will not be described again here. The locations of the polarization components O1 (including P2) and P1 (including O2) of the composite light beam at the displaced locations 172 and 170, respectively, are shown in the view 685.

The half-wave plate 661 rotates the angle of polarization of each of the polarization components O1 (including P2) and P1 (including O2) by 45°, as shown in the view 687. After rotation by the half-wave plate 661, the parallel polarization component P1 (including O2) of the composite light beam enters the optical waveguide 667. The angles of polarization of both P1 and O2 are orthogonal to the plane of the waveguide. The orthogonal polarization component O1 (including P2) enters the optical waveguide 669. The angles of polarization of both O1 and P2 are parallel to the plane of the waveguide.

The frequency of the RF signal fed to the 2-channel AOTF 663 via the RF input 671 is chosen such that the 2-channel AOTF rotates the angle of polarization of light of wavelength $\lambda d$ by exactly 90°. The passage of the polarization components O1 (including P2) and P1 (including O2) of the composite light beam through the optical waveguides 667 and 669, respectively, rotates the angles of polarization of the polarization components O2 and P2 of the light beam D by 90°. The angles of polarization of the polarization components O1 and P1 of the depleted composite light beam C', which is the composite light beam C without the light beam D, remain unchanged by their passage through the waveguides 669 and 667, respectively.

The angles of polarization of the polarization components O1 and P1 of the depleted composite light beam C' and those of the polarization components O2 and P2 of the light beam D are shown in the view 689. It can be seen that the angle of polarization of the polarization component P2 of the light beam D is now orthogonal that of the polarization component O1 of the composite light beam C', whereas before these polarization components were parallel. Also, the angle of polarization of the polarization component O2 is now orthogonal to that of the polarization component P1, whereas before these polarization components were parallel.

The de-alignment of the angles of polarization of the polarization components O2 and P2 of the light beam D with those of the polarization components P1 and O1, respectively, of the depleted light beam C' distinguishes the polarization components of the light beam D from those of the depleted composite light beam C' when the polarization components pass through the second I/O port 312. The second I/O port therefore directs the polarization components of the light beam D to the optical fibre 316 whereas it directs the polarization components of the depleted composite light beam C' to the optical fibre 314.

The half-wave plate 665 rotates the angle of polarization of each of the polarization components O1, O2, P1 and P2 by 45°, as shown in the view 691. After rotation by the half-wave plate 665, the locations and orientations the polarization components P1 and O2 correspond to those of the polarization components P1 and O2 shown in FIG. 2E, and the locations and orientations the polarization components O1 and P2 correspond to those of the polarization components O1 and P2 shown in FIG. 2E. As described above with reference to FIGS. 2E–2G, the second I/O port 312 overlays the polarization components P1 and O1 of the depleted composite light beam C' at the location of the optical fibre 314, as shown in the view 681. The depleted composite light beam C enters the optical fibre 314 for onward transmission. The second I/O port also overlays the polarization components P2 and O2 of the light beam D extracted from the composite light beam C at the location of the optical fibre 316. The light beam D enters the optical fibre 316. The optical fibre 316 may, for example, transmit the light beam D to a demodulator that will demodulate the information signal from the light beam D.

In the ADD/DROP mode, the composite light beam C enters the add-drop tunable filter 600 via the optical fibre 304. The composite light beam is depicted in the view 694 as including the polarization components O2 and P2 of the light beam D. These polarization components are respectively indicated by the long and short narrow, open bars. The light beam of wavelength $\lambda\alpha$ to be added to the composite light beam is connected to the compact add-drop filter via the optical fibre 306 as the light beam A. The light beam A has polarization components O3 and P3. These polarization components are respectively indicated by the long and short narrow, black bars.

The composite light beam C and the light beam A pass through the first I/O port 302 the same way as the polarization components of the light beams X and Y pass through the first I/O port 102 in the description of FIGS. 2A–2D. Therefore, the action of the first I/O port on the polarization components of the light beams A and C will not be described in detail again.

The locations of the polarization components of the composite light beam C and the light beam A at the displaced locations 170 and 172 are shown in the view 695. In this, the orthogonal polarization component O3 of the light beam A and the orthogonal polarization component O1 of the composite light beam, which includes the parallel polarization component P2 of the light beam D are located at the displaced location 170. The parallel polarization component P3 of the light beam A and the parallel polarization component P1 of the composite light beam, which includes the orthogonal polarization component O2 of the light beam D are located at the displaced location 172.

The half-wave plate 661 rotates the angle of polarization of each of the polarization components O1 (including P2), P1 (including O2), O3, and P3 by 45°, as shown in the view 696. After rotation by the half-wave plate 661, the parallel polarization component P1 of the composite light beam (including O2) and the polarization component O3 of the light beam A enter the optical waveguide 667. The angles of polarization of both polarization components P1 and O2 are orthogonal to the plane of the waveguide and that of O3 is orthogonal to the waveguide. The orthogonal polarization component O1 (includes P2) and the polarization component P3 enter the optical waveguide 669. The angles of polarization of both polarization components O1 and P2 are parallel to the plane of the waveguide and that of the polarization component P3 is orthogonal to the waveguide.

The 2-channel AOTF 663 is fed with an RF signal via the RF input 671. If the wavelengths $\lambda\alpha$ and $\lambda d$ are equal, the RF signal has a single frequency. This frequency is chosen such that the 2-channel AOTF rotates the angle of polarization of the light beams A and D by exactly 90°. If the wavelengths $\lambda\alpha$ and $\lambda d$ of the light beams A and D are different, the RF signal includes two frequency components each having the appropriate frequency to rotate the angle of polarization of one of the light beams A and D by 90°.

The 2-channel AOTF 663 rotates the angles of polarization of the polarization components O2 and P2 of the light beam D included in the composite light beam C by 90° as these polarization components of the composite light beam pass through the optical waveguides 667 and 669, respectively. This rotation makes the angles of polarization of the polarization components O2 and P2 of the light beam D orthogonal to those of the modified composite light beam C'. As a result, the second I/O port will deviate the polarization components O2 and P2 of the light beam D orthogonal differently from those of the modified composite light beam C', and will direct the light beam D to a different optical fibre from the modified composite light beam C'. This has the effect of extracting the light beam D from the composite light beam C.

The 2-channel AOTF 663 also rotates the angles of polarization of the polarization components O3 and P3 of the light beam A by 90° as these polarization components of the light beam A pass through the optical waveguides 667 and 669, respectively. This rotation makes the angles of polarization of the polarization components O3 and P3 of the light beam A parallel to those of the modified composite light beam C'. As a result, the second I/O port will apply the same deviations to the polarization components O3 and P3 of the light beam A as it applies to those of the modified composite light beam C', and will direct the light beam A to the same optical fibre as the modified composite light beam C'. This has the effect of adding the light beam A to the composite light beam C to form the modified composite light beam C'.

The 2-channel AOTF 663 leaves the angles of polarization of the polarization components O1 and P1 of the composite light beam C unchanged as they pass through the waveguides 669 and 667, respectively. Since the angles of polarization of the polarization components P2 and O2 of the light beam D are now orthogonal to those of the polarization components O1 and P1, whereas those of the polarization components P3 and O3 of the light beam A are now parallel to those of the polarization components O1 and P1, the composite light beam has been modified by its passage through the 2-channel AOTF, and will now be called the modified composite light beam.

The angles of polarization of the polarization components O1 (including P3) and P1 (including O3) of the modified composite light beam C' and those of the polarization components O2 and P2 of the light beam D following their passage through the 2-channel AOTF 663 are shown in the view 696. It can be seen that the angle of polarization of the polarization component P2 of the light beam D is now orthogonal that of the polarization component O1 of the composite light beam C', whereas before these polarization components were parallel. Also, the angle of polarization of the polarization component O2 is now orthogonal to that of the polarization component P1, whereas before these polarization components were parallel.

The half-wave plate 665 rotates the angle of polarization of each of the polarization components O1 (including P3), O2, P1 (including O3) and P2 by 45°, as shown in the view 697. After rotation by the half-wave plate 665, the locations and orientations the polarization components O1 (including P3) and P2 correspond to those of the polarization components O1 and P2 shown in FIG. 2E, and the locations and orientations the polarization components P1 (including O3) and O2 correspond to those of the polarization components P1 and O2 shown in FIG. 2E. As described above with reference to FIGS. 2E–2G, the second I/O port 312 overlays the polarization components P1 (including O3) and O1 (including P3) of the modified composite light beam C' at the location of the optical fibre 314, as shown in the view 698. The modified composite light beam C, now including the polarization components O3 and P3 of the light beam A, enters the optical fibre 314 for onward transmission. The second I/O port also overlays the polarization components P2 and O2 of the light beam D extracted from the composite light beam C at the location of the optical fibre 316. The light beam D enters the optical fibre 316. The optical fibre 316 may, for example, transmit the light beam D to a demodulator that will demodulate the information signal from the light beam D.

The way in which the first embodiment of the I/O ports according to the invention, such as the I/O ports 102 and 112, are made will now be described with reference to FIGS. 1A–1E and 7. Elongate crystals of rutile (titanium dioxide) or yttrium vanadate with a square or rectangular cross section are commercially available. These crystals are available with faces that are polished, accurately parallel or perpendicular to one another, and accurately aligned parallel to the walk-off direction of the crystal. However, the ends of the crystal need not be polished. Unpolished surfaces are indicated by shading throughout FIG. 7.

Figure 7:
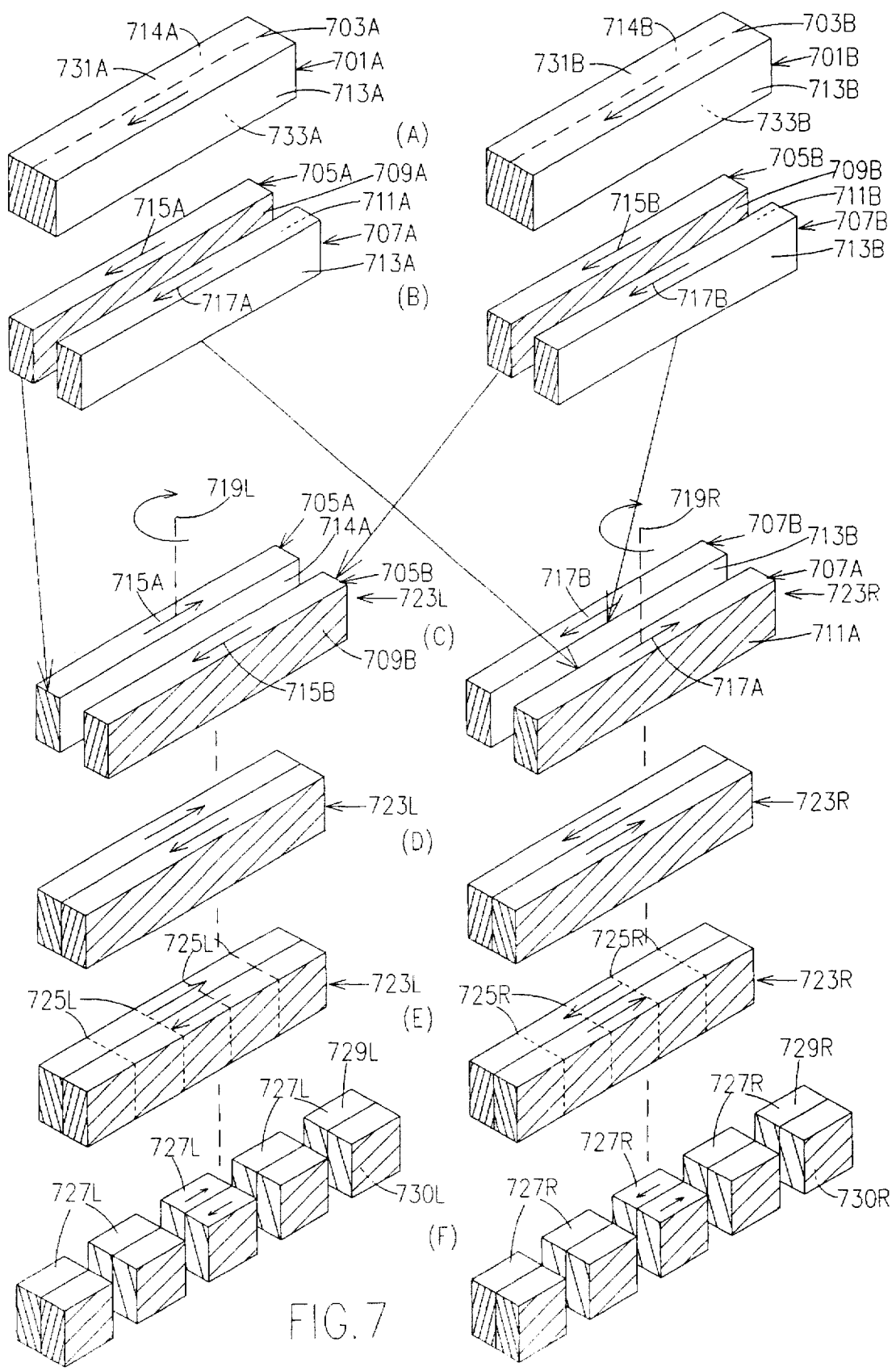
FIG. 7 illustrates a method according to the invention of making the opposed walk-off crystal pairs constituting at least part of the input/output ports used in both embodiments of the compact 2×n optical component according to the invention.

In a practical embodiment, two crystals 701A and 701B, each about 1 mm wide, 0.885 mm thick and 10 mm long, as shown in (A) of FIG. 7, were used. The thickness of each crystal is selected to provide the required walk-off amount of √2 times the spacing between the optical axes 160 and 162 of the light beams X and Y. Each crystal includes the polished side surface 713 and the polished side surface 714 opposite the polished side surface 713. Each crystal also includes the polished top surface 731, orthogonal to the polished side surfaces 713 and 714, and the polished bottom surface 733.

Two crystals are required because first opposed walk-off crystal pairs 120A or 120C and the second opposed walk-off crystal pairs 120B or 120D are mirror images of one another. Reference will be made below to left-handed and right-handed opposed walk-off crystal pairs. Of course, two crystals can be obtained simply by dividing one double-length crystal in half widthways.

In the following description, corresponding elements of the crystals 701A and 701B are indicated by the same reference numeral with the letter A or B, respectively, added. If no letter is added to a reference numeral referring to an element of the crystals 701A and 701B, or to the crystals themselves, the reference is to be understood to refer to both crystals.

The crystal 701A is divided lengthways along the line 703A in a first dividing operation. This provides two crystal halves 705A and 707A shown in (B). The crystal is preferably divided by sawing, but other suitable ways of dividing large crystals, such as cleaving, may be used. The crystal halves 705A and 707A each have a rough surface as a result of the dividing operation. The rough surface 709A of the crystal half 705A is shown in (B). The rough surface 711A of the crystal half 707A can be seen in (C). The crystal 701B is similarly divided to yield the crystal halves 705B and 707B having the respective rough surfaces 709B and 711B.

Because the polarization components pass through the opposed walk-off crystal pairs within a few tens of microns of the line of attachment 164 between the walk-off crystals constituting the opposed walk-off crystal pair, it is preferred that the attachment faces 132 and 134, where the walk-off crystals are joined, be smooth and polished. If the crystals are joined at their rough surfaces, diffraction at the rough surface will impair the integrity of the polarization components as they pass through the walk-off crystals.

The walk-off directions of the crystal halves 705 and 707 are indicated by the arrows 715 and 717. As shown in (B), the walk-off directions of the crystal halves remain parallel after the crystals have been divided to provide the crystal halves. In the opposed walk-off crystal pairs, the walk-off directions of the walk-off crystals are opposed. Moreover, the walk-off directions of the walk-off crystals are opposed in opposite senses in the first and second opposed walk-off crystal pairs.

To make opposed walk-off crystal pairs with different handedness, and for both opposed walk-off crystal pair to have smooth attachment surfaces without the need for additional polishing, a left-handed component block 723L is made from the crystal halves 705A and 705B. The crystal half 705A is rotated through 180° about the axis 719L, parallel to the smooth surface 713, as shown in (C). This reverses the walk-off direction 715A of the crystal half 705A relative to the walk-off direction 715B of the crystal half 705B, and also juxtaposes the smooth surface 713A of the crystal half 705A with the corresponding smooth surface (not shown) of the crystal half 705B.

The right-handed component block 723R is similarly made from the crystal halves 707A and 707B, also shown in (C). The crystal half 707A is rotated through 180° about the axis 719R, parallel to the rough surface 711A. This reverses the walk-off direction 717A of the crystal half 707A relative to the walk-off direction 717B of the crystal half 707B, and also juxtaposes the smooth surface 713B of the crystal half 705B with the corresponding smooth surface (not shown) of the crystal half 707B. Note that, in the right-handed component block 723R, the "B" crystal half is behind the "A" crystal half, whereas in the left-handed component block 723L, the "B" crystal half is in front of the "A" crystal half.

In the remainder of the processing, the component blocks 723L and 723R are treated the same. Only the processing applied to the component block 723L will be described.

One of the opposed smooth surfaces, for example the smooth surface 713A, of the pair of crystal halves 705A and 705B constituting the left-handed component block 723L is coated with a thin layer of a suitable adhesive. The opposed smooth surfaces are brought into contact with one another, and the adhesive is cured. An optically-clear epoxy or a UV-cured epoxy is the preferred adhesive. The layer of adhesive holds the crystal halves constituting the component block 723L together. The completed component block 723L is shown in (D).

The lea-handed component block 723L is divided into multiple left-handed opposed walk-off crystal pairs in a second dividing operation. Right-handed opposed walk-off crystal pairs are made by dividing the right-handed component block 723R. The lea-handed component block 723L is divided into individual opposed walk-off crystal pairs by dividing it widthways along the broken dividing lines 725L shown in (E). In the preferred embodiment, the dividing lines are about 1 mm apart. The component block is preferably divided by sawing, but other suitable ways of dividing crystals, such as cleaving, may be used.

The left-handed opposed walk-off crystal pairs 727L resulting from dividing the left-handed component block 723L are shown in (F). Also shown in (F) are the right-handed opposed walk-off crystal pairs 727R resulting from dividing the right-handed component block 723R.

It can be seen in (F) that each opposed walk-off crystal pair 727 has a smooth, polished face 729 that was originally part of the smooth, polished face 730 of the crystal 701. Each opposed walk-off crystal pair also has a smooth, polished face 730 opposite the face 729 that was originally part of the smooth, polished surface 733. The smooth, polished face 729 and the smooth, polished face 730 of the opposed walk-off crystal pair 727 correspond to the first face 122 and the second face 126, respectively, of the opposed walk-off crystal pairs 120A–120D.

When a left-handed opposed walk-off crystal pair 727L and a right-handed opposed walk-off crystal pair 727R form an I/O port, the smooth, polished face 730L of the left-hand opposed walk-off crystal pair contacts the smooth, polished first face 729R of the right-hand opposed walk-off crystal pair. Light is transmitted and received via the smooth, polished first face 729L of the left-handed opposed walk-off crystal pair 727L and the smooth, polished face 730R of the second opposed walk-off crystal pair 727R.

Figure 8A:
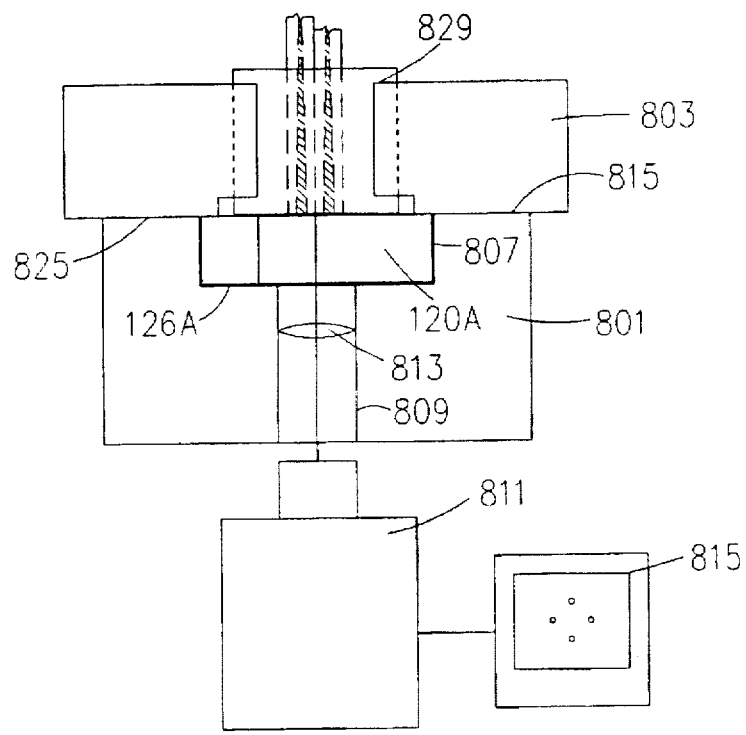
FIGS. 8A and 8B show schematic representations of jigs that may be used to align the light alignment assembly with the first opposed walk-off crystal pair and to align the light alignment assembly and first opposed walk-off crystal pair with the second opposed walk-off crystal pair in the process of making the input/output ports of the embodiment of the compact 2×n optical component according to the invention shown in FIGS. 3A–3D.
Figure 8B:
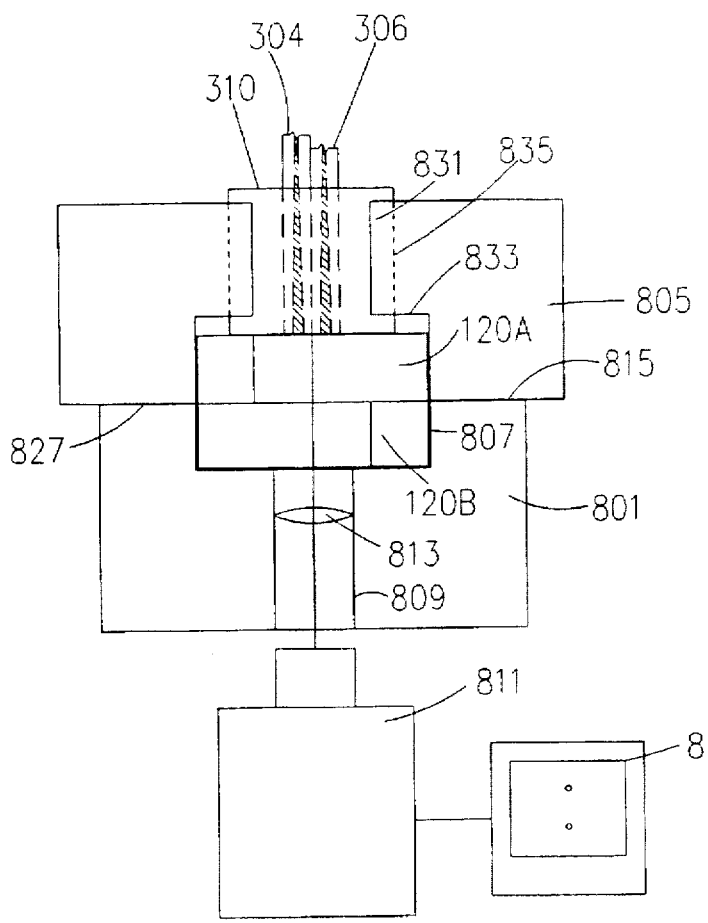

FIGS. 8A and 8B illustrate the currently-preferred way of attaching the light coupling assembly to the first opposed walk-off crystal pair in the second embodiment of the I/O port shown in FIGS. 3A–3D and of attaching the second opposed walk-off crystal pair to the first opposed walk-off crystal pair. As noted above, the optical fibres 304 and 306 must be precisely located, both spatially and rotationally, relative to the optical axis 124 defined by the plane of the first surface 122A of the first opposed walk-off crystal pair 120A, and the intersection of the lines of attachment 164A and 164B. To ensure an accurate alignment, this alignment is preferably done actively.

The light coupling assembly 310, composed of the TEC optical fibres 304 and 306 mounted in the bore of the capillary 319, was pre-assembled by the manufacturer of the TEC optical fibres, Sumitomo Osaka Cemento Co. Ltd., of Chyoda-ku, Tokyo, Japan.

The components of the I/O ports are aligned using jigs similar to those schematically represented in FIGS. 8A and 8B. The jigs each have a common static portion 801, and a different, but similar, moveable portion. The jig shown in FIG. 8A is used to align the light alignment assembly 310 with the first opposed walk-off crystal pair 120A. In this, the moveable portion 803 is adapted to accommodate the light alignment assembly. The jig shown in FIG. 8B is used to align the assembled light alignment assembly 310 and first opposed walk-off crystal pair with the second opposed walk-off crystal pair 120B. In this, the moveable portion 805 is adapted to accommodate the light alignment assembly and first opposed walk-off crystal pair.

The static portion 801 includes the recess 807. The recess is dimensioned to accommodate an opposed walk-off crystal pair 120A made as just described. A central bore 809 communicates with the recess and allows light emitted from the second surface 126A of the opposed walk-off crystal pair to be focused on the video camera 811 by the lens 813. The output of the video camera is displayed on the monitor 815. The video camera and monitor can be replaced by a microscope or other optical device suitable for observing an approximately 200 μm-diameter area in the center of the second surface of the opposed walk-off crystal pair.

Finally, the static portion 803 includes the surface 815 that supports the interchangeable moveable portions 803 or 805, and relative to which the moveable portions are free to move laterally and rotationally within relatively narrow constraints.

The moveable portions 803 and 805 each include a surface 825 and 827, respectively, that is supported by the surface 815 of the static portion 801, and that slides laterally and rotationally relative to the surface 815. The moveable portions each also include a chuck 829 and 831, respectively. The chuck is dimensioned to grip the capillary 319 of the light alignment assembly 310. Although not shown, the chucks 829 and 831 also define the axial position and rotational orientation of the light alignment assembly 310 relative to the surfaces 825 and 827, respectively. The moveable portion 805 additionally includes the recess 833 that is dimensioned to accommodate snugly the first opposed walk-off crystal pair 120A.

In the first stage of making an I/O port, a left-handed opposed walk-off crystal pair 120 is inserted into the recess 807 of the static portion 801 with the line of attachment 164A (FIG. 3A–D) oriented in a predetermined direction. The light alignment assembly 310 is inserted into the chuck 829 and the optical fibres 304 and 306 are connected to suitable light sources. A small portion of UV-curable adhesive is applied to the first surface 122A of the opposed walk-off crystal pair 120 and the moveable portion 803 is applied to the static portion 801. This locates the light alignment assembly fairly close to, but not necessarily at, the correct lateral and rotational orientation relative to the first opposed walk-off crystal pair. Accordingly, the moveable portion must be manipulated to bring the light alignment assembly into the correct lateral and rotational orientation relative to the first opposed walk-off crystal pair.

Close contact between the light alignment assembly 310 and the first opposed walk-off crystal pair 120A results in light being transmitted from the optical fibres 304 and 306 to the opposed walk-off crystal pair. Spots of light will appear on the monitor 815. The moveable portion 803 of the jig is then manipulated to optimize the relative lateral and rotational orientation of the light alignment assembly and the opposed walk-off crystal pair. Correct orientation is indicated by the rhomboidal arrangement of equally-spaced light spots shown in FIG. 8A. When the alignment is correct, the jig is irradiated with UV light to cure the adhesive.

In the second stage of making an I/O port, a right-handed opposed walk-off crystal pair 120B is inserted into the recess 807 of the static portion 801 with the line of attachment 164B (FIG. 3A–D) oriented in a predetermined direction, orthogonal to that of the line of attachment 164A. The sub-assembly 835, composed of the light alignment assembly 310 attached in correct alignment to the first opposed walk-off crystal pair 120A is inserted into the chuck 831 of the static portion 805. The optical fibres 304 and 306 are connected to suitable light sources. A small portion of UV-curable adhesive is applied to the first surface 122B of the second opposed walk-off crystal pair 120B and the moveable portion 805 is applied to the static portion 801. This locates the light alignment assembly and first opposed walk-off crystal pair fairly close to, but not necessarily at, the correct lateral and rotational orientation relative to the second opposed walk-off crystal pair. Accordingly, the moveable portion must be manipulated to bring the light alignment assembly and first opposed walk-off crystal pair into the correct lateral and rotational orientation relative to the second opposed walk-off crystal pair.

Close contact between the sub-assembly 835 and the second opposed walk-off crystal pair 120B results in light being transmitted from the optical fibres to the second opposed walk-off crystal pair. Spots of light will appear on the monitor 815. The moveable portion 805 of the jig is then manipulated to optimize the relative lateral and rotational orientation of the sub-assembly 835 and the second opposed walk-off crystal pair 120B. Correct orientation is indicated by the appearance of only two circular light spots, as shown in FIG. 8B. The appearance of only two circular light spots indicates that a polarization component from the light beam X received via the optical fibre 304 and an orthogonal polarization component from the light beam Y received via the optical fibre 306 are properly overlaid with one another at each of the displaced locations 170 and 172 (FIG. 2C). When the alignment is correct, the jig is irradiated with UV light to cure the adhesive. A parallelogram arrangement of light spots indicates that the light alignment assembly and first opposed walk-off crystal pair are 180° misaligned relative to the second opposed walk-off crystal pair.

Although this disclosure describes illustrative embodiments of the invention in detail, it is to be understood that the invention is not limited to the precise embodiments described, and that various modifications may be practiced within the scope of the invention defined by the appended claims.

I claim:

1. A compact, 2×n polarization-independent optical component, comprising:

a first I/O port, including:

a first opposed walk-off crystal pair and a second opposed walk-off crystal pair, the second opposed walk-off crystal pair being a mirror image of the first opposed walk-off crystal pair, each opposed walk-off crystal pair comprising:

two walk-off crystals, each of the walk-off crystals having a walk-off direction and including an attachment face substantially parallel to the walk-off direction, the walk-off crystals being attached to one another with their attachment faces in contact and their walk-off directions opposed, the opposed walk-off directions of the walk-off crystals of the first opposed walk-off crystal pair and the opposed walk-off directions of the walk-off crystals of the second opposed walk-off crystal pair defining opposite rotational directions;

a first face orthogonal to the attachment faces; and a second face opposite the first face, the opposed walk-off crystal pairs being attached to one another with the first face of one in contact with the second face of the other, and the walk-off direction of the one orthogonal to the walk-off direction of the other;

a second I/O port, the second I/O port being optically aligned with the first I/O port; and a polarization-changing optical element located between the first I/O port and the second I/O port.

2. The compact, 2×n polarization-independent optical component of claim 1, in which:

each of the opposed walk-off crystal pairs additionally includes a first axis extending orthogonally to the first faces of the opposed walk-off crystal pairs from an intersection of the attachment faces of the opposed walk-off crystal pairs; and the first I/O port additionally includes:

a capillary defining a bore, the capillary being attached to the second face of one of the opposed walk-off crystal pairs with the bore centered on, and longitudinally aligned with, the first axis, and two optical fibres, each of the optical fibres having an optical axis, the optical fibres being housed in parallel, inside, and in contact with, the bore of the capillary, a second axis extending between the optical axes of the optical fibres being aligned at substantially 45 degrees to the walk-off directions of the opposed walk-off crystal pairs.

3. The compact, 2×n polarization-independent optical component of claim 2, in which the optical fibres are thermally-diffused expanded core (TEC) optical fibres.

4. The compact, 2×n polarization-independent optical component of claim 3, in which:

the optical axes of the optical fibres are separated by a separation amount; and each of the walk-off crystals has a thickness selected to provide a walk-off amount substantially equal to the separation amount divided by a square root of two.

5. A 2×2 optical switch including the compact, 2×n polarization-independent optical component of claim 1, 2, or 3, in which the optical switch selectably has a BAR state and a CROSS state, and in which the polarization-changing optical element includes:

a 0°/90° polarization rotator; and means for controlling the 0°/90° polarization rotator to provide a polarization rotation of 0° in one of the BAR state and the CROSS state of the optical switch and a polarization rotation of 90° in the other one of the BAR state and the CROSS state of the optical switch.

6. A four-port optical circulator including the compact, 2×n polarization-independent optical component of claim 1, 2 or 3, in which the polarization-changing optical element includes a serial arrangement of:

a Faraday rotator; and a half-wave plate.

7. A tunable add-drop filter including the compact, 2×n polarization-independent optical component of claim 1, 2 or 3, in which the polarization-changing optical element includes a serial arrangement of:

two half-wave plates; and a two-channel acousto-optical tuneable filter located between the half-wave plates.

8. The compact, 2×n polarization-independent optical component of claim 2, in which the second I/O port includes:

a first walk-off crystal having a first walk-off direction, the first walk-off direction being parallel to the walk-off directions of the walk-off crystals of one of the opposed walk-off crystal pairs of the first I/O port;

a second walk-off crystal having a second walk-off direction, the second walk-off direction being orthogonal to the first walk-off direction;

a third optical fibre, remote from the first I/O port; and a lens disposed between the second walk-off crystal and the third optical fibre at a location at which the lens forms an image of the core of one of the optical fibres on the core of the third optical fibre.

9. A 2×1 optical switch including the compact, 2×n polarization-independent optical component of claim 8, in which the optical switch selectably has a BAR state and a CROSS state, and in which the polarization-changing optical element includes:

a 0°/90° polarization rotator; and means for controlling the 0°/90° polarization rotator to provide a polarization rotation of 0° in one of the BAR state and the CROSS state of the optical switch and a polarization rotation of 90° in the other one of the BAR state and the CROSS state of the optical switch.

10. A three-port optical circulator including the compact, 2×2 polarization-independent optical component of claim 8, in which the polarization-changing optical element includes a serial arrangement of:

a Faraday rotator; and a half-wave plate.

11. A tunable add-only or drop-only filter including the compact, 2×n polarization-independent optical component of claim 8, in which the polarization-changing optical element includes a serial arrangement of:

two half-wave plates; and a two-channel acousto-optical tuneable filter located between the half-wave plates.

12. The compact, 2×n polarization-independent optical component of claim 2, in which:

the opposed walk-off crystal pairs of the first I/O port have a thickness; and the second I/O port includes:

a thick walk-off crystal having a first walk-off direction disposed at 45° to the walk-off directions of the walk-off crystals of one of the opposed walk-off crystal pairs of the first I/O port, and having a thickness equal to the thickness of the one of the opposed walk-off crystal pairs, multiplied by a square root of two, a third optical fibre, remote from the first I/O port, and a lens disposed between the thick walk-off crystal and the third optical fibre at a location at which the lens forms an image of the core of one of the optical fibres on the core of the third optical fibre.

13. A 2×1 optical switch including the compact, 2×n polarization-independent optical component of claim 12, in which the optical switch selectably has a BAR state and a CROSS state, and in which the polarization-changing optical element includes:

a serial arrangement of a 0°/90° polarization rotator and a half-wave plate; and means for controlling the 0°/90° polarization rotator to provide a polarization rotation of 0° in one of the BAR state and the CROSS state of the optical switch and a polarization rotation of 90° in the other one of the BAR state and the CROSS state of the optical switch.

14. A three-port optical circulator including the compact, 2×2 polarization-independent optical component of claim 12, in which the polarization-changing optical element includes a Faraday rotator.

15. A tunable add-only or drop-only filter including the compact, 2×n polarization-independent optical component of claim 12, in which the polarization-changing optical element includes a serial arrangement of:

a two-channel acousto-optical tuneable filter; and a half-wave plate located between the two-channel acousto-optical tuneable filter and the first I/O port.

16. The compact, 2×n polarization-independent optical component of claim 1, in which the second I/O port includes:

a first walk-off crystal having a first walk-off direction, the first walk-off direction being parallel to the walk-off directions of the walk-off crystals constituting one of the opposed walk-off crystal pairs; and a second walk-off crystal having a second walk-off direction, the second walk-off direction being orthogonal to the first walk-off direction.

17. A 2×1 optical switch including the compact, 2×n polarization-independent optical component of claim 16, in which the optical switch selectably has a BAR state and a CROSS state, and in which the polarization-changing optical element includes:

a 0°/90° polarization rotator; and means for controlling the 0°/90° polarization rotator to provide a polarization rotation of 0° in one of the BAR state and the CROSS state of the optical switch and a polarization rotation of 90° in the other one of the BAR state and the CROSS state of the optical switch.

18. A three-port optical circulator including the compact, 2×2 polarization-independent optical component of claim 16, in which the polarization-changing optical element includes a serial arrangement of:

a Faraday rotator; and a half-wave plate.

19. A tunable add-only or drop-only filter including the compact, 2×n polarization-independent optical component of claim 16, in which the polarization-changing optical element includes a serial arrangement of:

two half-wave plates; and a two-channel acousto-optical tuneable filter located between the half-wave plates.

20. The compact, 2×n polarization-independent optical component of claim 1, in which:

the opposed walk-off crystal pairs of the first I/O port have a thickness; and the second I/O port includes a thick walk-off crystal having a walk-off direction disposed at 45° to the walk-off directions of the walk-off crystals of one of the opposed walk-off crystal pairs of the first I/O port, and having a thickness equal to the thickness of the one of the opposed walk-off crystal pairs, multiplied by a square root of two.

21. A 2×1 optical switch including the compact, 2×n polarization-independent optical component of claim 20, in which the optical switch selectably has a BAR state and a CROSS state, and in which the polarization-changing optical element includes:

a serial arrangement of a 0°/90° polarization rotator and a half-wave plate; and means for controlling the 0°/90° polarization rotator to provide a polarization rotation of 0° in one of the BAR state and the CROSS state of the optical switch and a polarization rotation of 90° in the other one of the BAR state and the CROSS state of the optical switch.

22. A three-port optical circulator including the compact, 2×2 polarization-independent optical component of claim 20, in which the polarization-changing optical element includes a Faraday rotator.

23. A tunable add-only or drop-only filter including the compact, 2×n polarization-independent optical component of claim 20, in which the polarization-changing optical element includes a serial arrangement of:

a two-channel acousto-optical tuneable filter; and a half-wave plate located between the two-channel acousto-optical tuneable filter and the first I/O port.

24. The compact, 2×n polarization-independent optical component of claim 20, additionally comprising a birefringent crystal disposed between the polarization-rotating optical element and the second I/O port.

25. An input/output port for a compact, 2×n optical fibre-based optical component, the input/output port comprising:

two opposed walk-off crystal pairs, each of the opposed walk-off crystal pairs including:

two walk-off crystals, each of the walk-off crystals having a walk-off direction and including an attachment face substantially parallel to the walk-off direction, the walk-off crystals being attached to one another with their attachment faces in contact and their walk-off directions opposed, the opposed walk-off directions of the walk-off crystals of the first opposed walk-off crystal pair and the opposed walk-off directions of the walk-off crystals of the second opposed walk-off crystal pair defining opposite rotational directions, a first face orthogonal to the attachment faces, and a second face opposite the first face, the opposed walk-off crystal pairs being attached to one another with the first face of one in contact the second face of the other, and with the walk-off direction of the one orthogonal to the walk-off direction of the other, the attachment faces of the opposed walk-off crystal pairs intersecting at an intersection from which a first axis extends orthogonally to the first faces;

a capillary defining a bore, the capillary being attached to the second face of one of the opposed walk-off crystal pairs with the bore centered on, and longitudinally aligned with, the first axis; and two optical fibres, each of the optical fibres having an optical axis, the optical fibres being housed in parallel, inside, and in contact with, the bore of the capillary, a second axis extending between the optical axes of the optical fibres being aligned at 45 degrees to the walk-off directions of the opposed walk-off crystal pairs.

26. The input/output port of claim 25, in which the optical fibres are thermally-diffused expanded core (TEC) optical fibres.

27. The input/output port of claim 26, in which:

the optical axes of the optical fibres are separated by a separation amount; and each of the walk-off crystals has a thickness selected to provide a walk-off amount substantially equal to the separation amount divided by a square root of two.

28. A method of making a compact, 2×n polarization-independent optical input/output port, the method comprising steps of:

providing a first component block having a first handedness and a second component block having a second handedness, the first component block including a first walk-off crystal half having a first walk-off direction and a second walk-off crystal half having a second walk-off direction, the first crystal half being attached to the second crystal half with the first walk-off direction opposed to the second walk-off direction, the opposed first and second walk-off directions defining a first rotational direction, and the second component block including a third walk-off crystal half having a third walk-off direction and a fourth walk-off crystal half having a fourth walk-off direction, the third crystal half being attached to the fourth walk-off crystal half with the third walk-off direction opposed to the fourth walk-off direction, the opposed third and fourth walk-off directions defining a second rotational direction, opposite the first rotational direction;

dividing the first component block in a direction orthogonal to the first and second walk-off directions to provide first opposed walk-off crystal pairs, the first opposed walk-off crystal pairs having the first handedness, and dividing the second component block in a direction orthogonal to the third and fourth walk-off directions to provide second opposed walk-off crystal pairs, the second opposed walk-off crystal pairs having the second handedness; and attaching one of the first opposed walk-off crystal pairs to one of the second opposed walk-off crystal pairs with the first and second walk-off directions orthogonal to the third and fourth walk-off directions.

29. The method of claim 28, in which the step of providing a first component block and a second component block includes steps of:

providing a first walk-off crystal and a second walk-off crystal, each walk-off crystal having four polished surfaces;

dividing each walk-off crystal lengthways to provide the first crystal half and the third crystal half from the first walk-off crystal and the second crystal half and the fourth crystal half from the second walk-off crystal, the first crystal half spatially corresponding to the second crystal half, the third crystal half spatially corresponding to the fourth crystal half, each crystal half including one of polished surfaces of the corresponding walk-off crystal and having a rough surface opposite the one of the polished surfaces;

forming the first component block by attaching the first crystal half to the second crystal half with the one of the polished surfaces of the first crystal half in contact with the one of the polished surfaces of the second crystal half and the first walk-off direction opposed to the second walk-off direction, the opposed first walk-off direction and the second walk-off direction defining the first rotational direction;

forming the second component block by attaching the third crystal half to the fourth crystal half with the one of the polished surfaces of the third crystal half in contact with the one of the polished surfaces of the fourth crystal half and the third walk-off direction opposed to the fourth walk-off direction, the opposed third walk-off direction and the fourth walk-off direction defining the second rotational direction.

30. The method of claim 28 or 29, in which:

in the step of providing a first component block and a second component block, the first walk-off crystal half is attached to the second walk-off crystal half at a first line of attachment, and the third walk-off crystal half is attached to the fourth walk-off crystal half at a second line of attachment;

in the step of attaching one of the first opposed walk-off crystal pairs to one of the second opposed walk-off crystal pairs, a second face of the one of the first opposed walk-off crystal pairs is attached to a first face of the one of the second opposed walk-off crystal pairs, and the first line of attachment intersects the second line of attachment at an intersection; and the method additionally comprising steps of:
   providing a light alignment assembly comprising:
      a capillary defining a bore, and
      two optical fibres, each of the optical fibres having an optical axis, the optical fibres being housed in parallel, inside, and in contact with, the bore of the capillary, a first axis extending between the optical axes of the optical fibres; and
   attaching the light alignment assembly to a first face of the one of the first opposed walk-off crystal pairs, opposite the second face of the one of the first opposed walk-off crystal pairs, the light alignment assembly being attached with the bore centered on the intersection and the first axis aligned at substantially 45 degrees to the walk-off directions of the opposed walk-off crystal pairs.

* * * * *